US012561597B2

(12) United States Patent (10) Patent No.: US 12,561,597 B2
Fowler (45) Date of Patent: Feb. 24, 2026

(54) PARALLEL MATCHING FOR QUANTUM ERROR CORRECTION

(71) Applicant: Google LLC, Mountain View, CA (US)

(72) Inventor: Austin Fowler, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/667,472

(22) Filed: May 17, 2024

(65) Prior Publication Data

US 2024/0386307 A1 Nov. 21, 2024

Related U.S. Application Data

(60) Provisional application No. 63/503,297, filed on May 19, 2023, provisional application No. 63/503,304, filed on May 19, 2023.

(51) Int. Cl.
*G06N 10/70* (2022.01)
*G06N 10/00* (2022.01)

(52) U.S. Cl.
CPC ............. *G06N 10/70* (2022.01); *G06N 10/00* (2019.01)

(58) Field of Classification Search
CPC ................................ G06N 10/70; G06N 10/00
See application file for complete search history.

(56) References Cited

U.S. PATENT DOCUMENTS

| | | | | | |
|---|---|---|---|---|---|
| 11,580,436 | B2 * | 2/2023 | Chamberland | ........ | H04B 10/00 |
| 12,204,406 | B2 * | 1/2025 | Jones | .................. | G06F 16/9024 |
| 12,301,251 | B2 * | 5/2025 | Zhang | ................ | H03M 13/1108 |

OTHER PUBLICATIONS

Brown, Benjamin, et al., Parallelized quantum error correction with fracton topological codes, Mar. 12, 2020, American Physical Society, https://journals.aps.org/prresearch/abstract/10.1103/PhysRevResearch.2.013303 (Year: 2020).*
Edmonds, "Maximum Matching and a Polyhedron with 0,1-Vertices", Journal of Research of the National Bureau of Standards-B. Mathematics and Mathematical Physics, vol. 69B, No. 1-2, Jan.-Jun. 1965, pp. 125-130.
Edmonds, Paths, Trees, and Flowers, Canadian Journal of Mathematics, vol. 17, 1965, pp. 449-467.

(Continued)

*Primary Examiner* — Justin R Knapp
(74) *Attorney, Agent, or Firm* — DORITY & MANNING P.A.

(57) ABSTRACT

The disclosure is directed to a method performed during an execution of a quantum algorithm, via a quantum computing system (QCS) that includes a set of qubits and a set of classical processor devices. The quantum algorithm includes a quantum error correction (QEC) code that includes a set of qubit measurements over the set of qubits. Prior to the execution of the QA, the classical processor devices generate a matching graph (MG). During the execution of the quantum algorithm, the following operations are interleaved. A current subset of qubit measurements is performed. The qubit measurements are based on the QEC code. The classical processor devices update the MG based on values of the current subset of qubit measurements. The set of classical processor devices decodes one or more qubit errors based on the updated MG.

20 Claims, 8 Drawing Sheets

(56) References Cited

OTHER PUBLICATIONS

Fowler et al., "Towards Practical Classical Processing for the Surface Code: Timing Analysis", arXiv:1202.5602v2, Oct. 15, 2012, 13 pages.

Fowler, "Minimum Weight Perfect Matching of Fault-tolerant Topological Quantum Error Correction in Average O(1) Parallel Time", arXiv:1307.1740v3, Oct. 10, 2014, 8 pages.

Fowler, "Optimal Complexity Correction of Correlated Errors in the Surface Code", arXiv:1310.0863v1, 6 pages.

GitHub.com, "Yuewuo/Fusion-Blossom", Oct. 18, 2024, https://github.com/yuewuo/fusion-blossom, retrieved on Nov. 25, 2024, 8 pages.

Bombin et al., "Modular Decoding: Parallelizable Real-Time Decoding for Quantum Computers", arXiv:2303.04846v1, Mar. 8, 2023, 23 pages.

International Search Report and Written Opinion for Application No. PCT/US2024/029957, mailed Oct. 8, 2025, 15 pages.

Paler et al., "Pipelined Correlated Minimum Weight Perfect Matching of the Surface Code", arXiv:2205.09828v1, May 19, 2022, 6 pages.

Skoric et al., "Parallel Window Decoding Enables Scalable Fault Tolerant Quantum Computation", arXiv:2209.08552v2, Feb. 4, 2023, 12 pages.

Wu et al., "Fusion Blossom: Fast MWPM Decoders for QEC", arXiv:2305.08307v1, May 15, 2023, 18 pages.

* cited by examiner

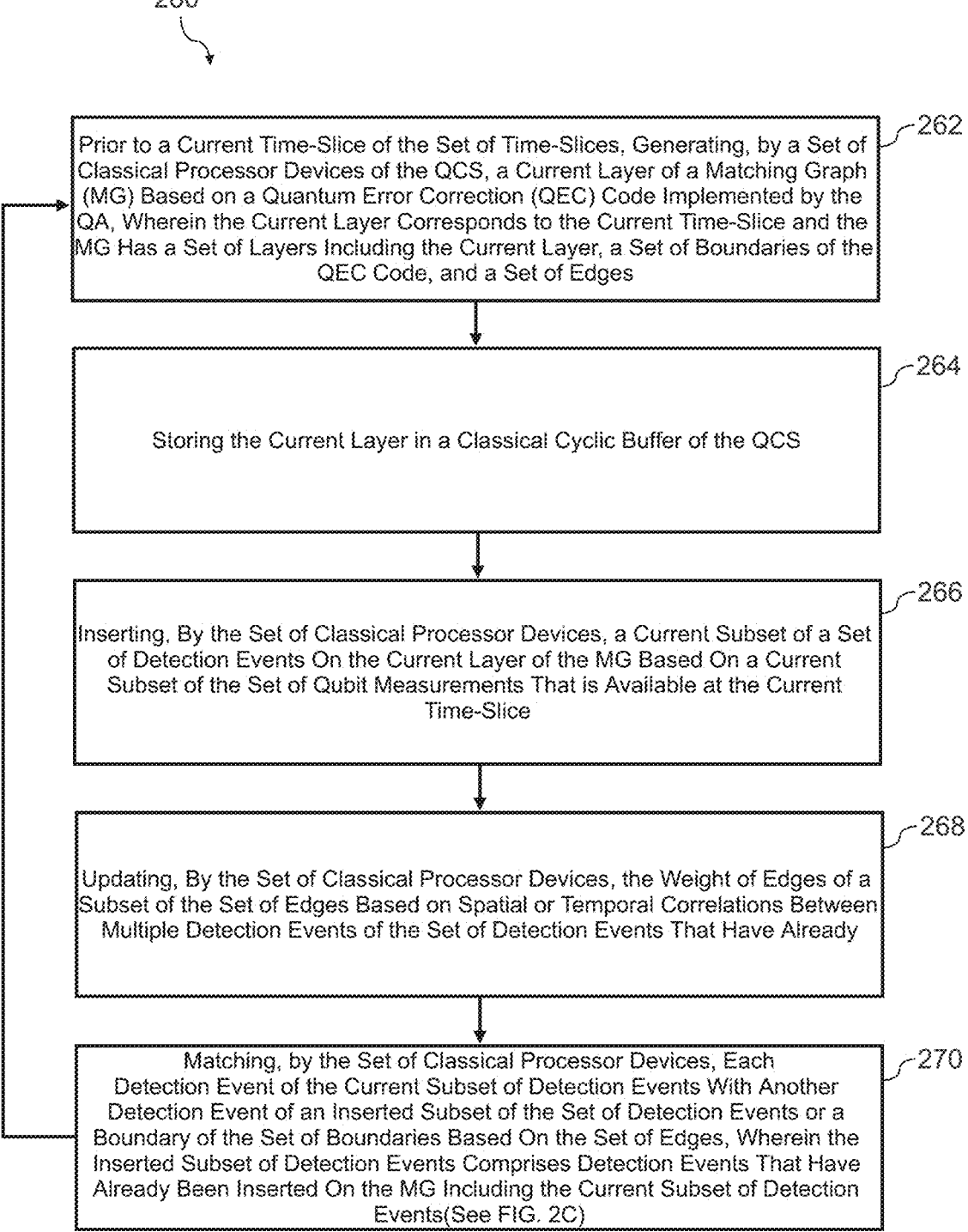

260

Prior to a Current Time-Slice of the Set of Time-Slices, Generating, by a Set of Classical Processor Devices of the QCS, a Current Layer of a Matching Graph (MG) Based on a Quantum Error Correction (QEC) Code Implemented by the QA, Wherein the Current Layer Corresponds to the Current Time-Slice and the MG Has a Set of Layers Including the Current Layer, a Set of Boundaries of the QEC Code, and a Set of Edges                                    262

Storing the Current Layer in a Classical Cyclic Buffer of the QCS                       264

Inserting, By the Set of Classical Processor Devices, a Current Subset of a Set of Detection Events On the Current Layer of the MG Based On a Current Subset of the Set of Qubit Measurements That is Available at the Current Time-Slice                                    266

Updating, By the Set of Classical Processor Devices, the Weight of Edges of a Subset of the Set of Edges Based on Spatial or Temporal Correlations Between Multiple Detection Events of the Set of Detection Events That Have Already                                    268

Matching, by the Set of Classical Processor Devices, Each Detection Event of the Current Subset of Detection Events With Another Detection Event of an Inserted Subset of the Set of Detection Events or a Boundary of the Set of Boundaries Based On the Set of Edges, Wherein the Inserted Subset of Detection Events Comprises Detection Events That Have Already Been Inserted On the MG Including the Current Subset of Detection Events(See FIG. 2C)                                    270

FIG. 2B

272

274

Performing, by the Set of Classical Processor Devices, a Cheap-Matching Algorithm That Matches a Detection Event of the Set of Detection Events With Another Detection Event of the Set of Detection Events or a Boundary of the QEC That Are Joined By a Single Edge of the Set of Edges

276

Performing, By the Set of Classical Processor Devices, a Full-Matching Algorithm That Matches Pairs of Detection Events, Wherein Detection Event of Each Pair of Detection Events Matched By the Full-Matching Algorithm Was Left Unmatched By the Cheap-Matching Algorithm

FIG. 2C

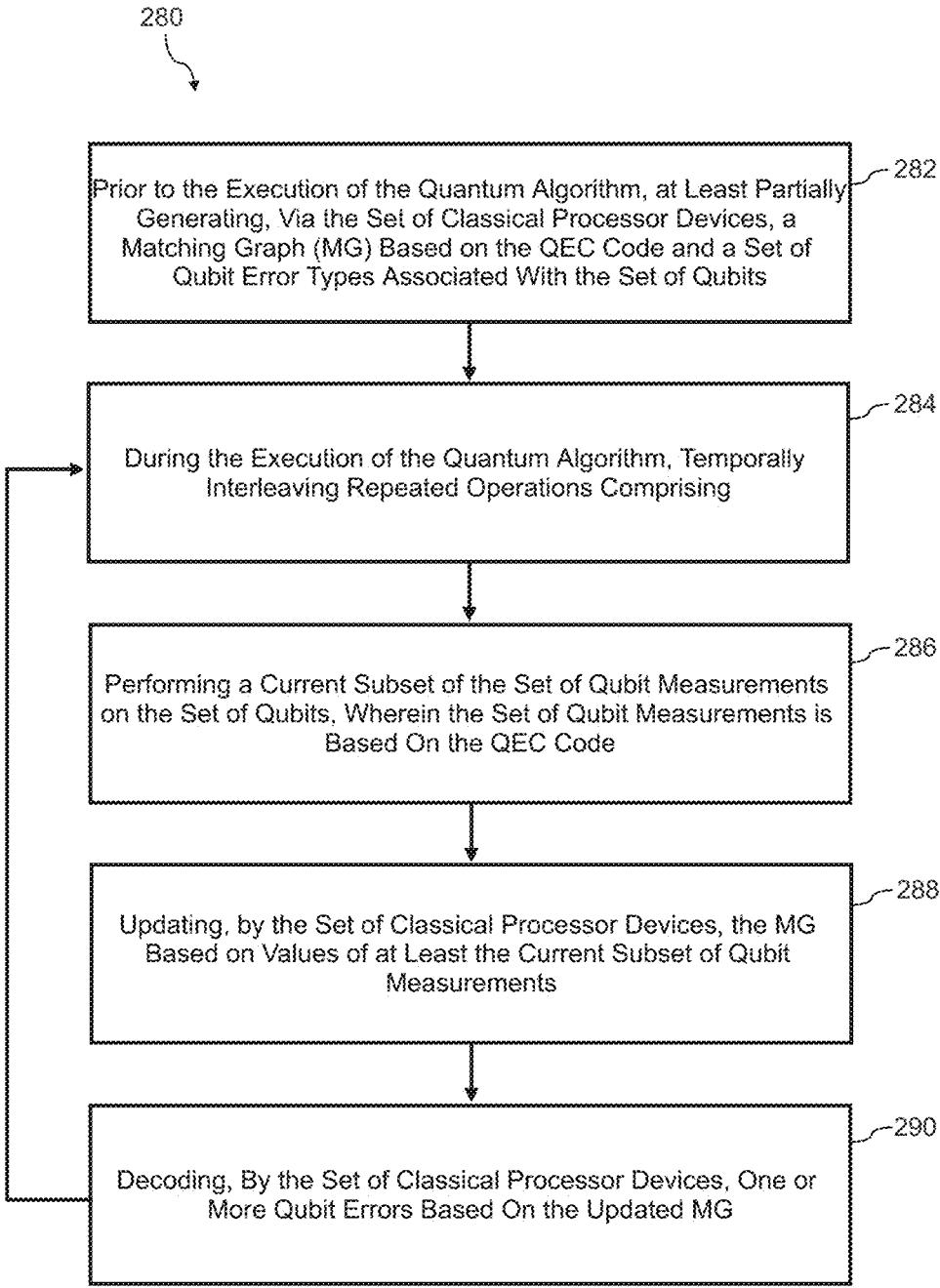

280

282

Prior to the Execution of the Quantum Algorithm, at Least Partially Generating, Via the Set of Classical Processor Devices, a Matching Graph (MG) Based on the QEC Code and a Set of Qubit Error Types Associated With the Set of Qubits

284

During the Execution of the Quantum Algorithm, Temporally Interleaving Repeated Operations Comprising

286

Performing a Current Subset of the Set of Qubit Measurements on the Set of Qubits, Wherein the Set of Qubit Measurements is Based On the QEC Code

288

Updating, by the Set of Classical Processor Devices, the MG Based on Values of at Least the Current Subset of Qubit Measurements

290

Decoding, By the Set of Classical Processor Devices, One or More Qubit Errors Based On the Updated MG

FIG. 2D

Matching
Graph
300

Matching Graph 400

Second Graph Region 440

First Graph Region 420

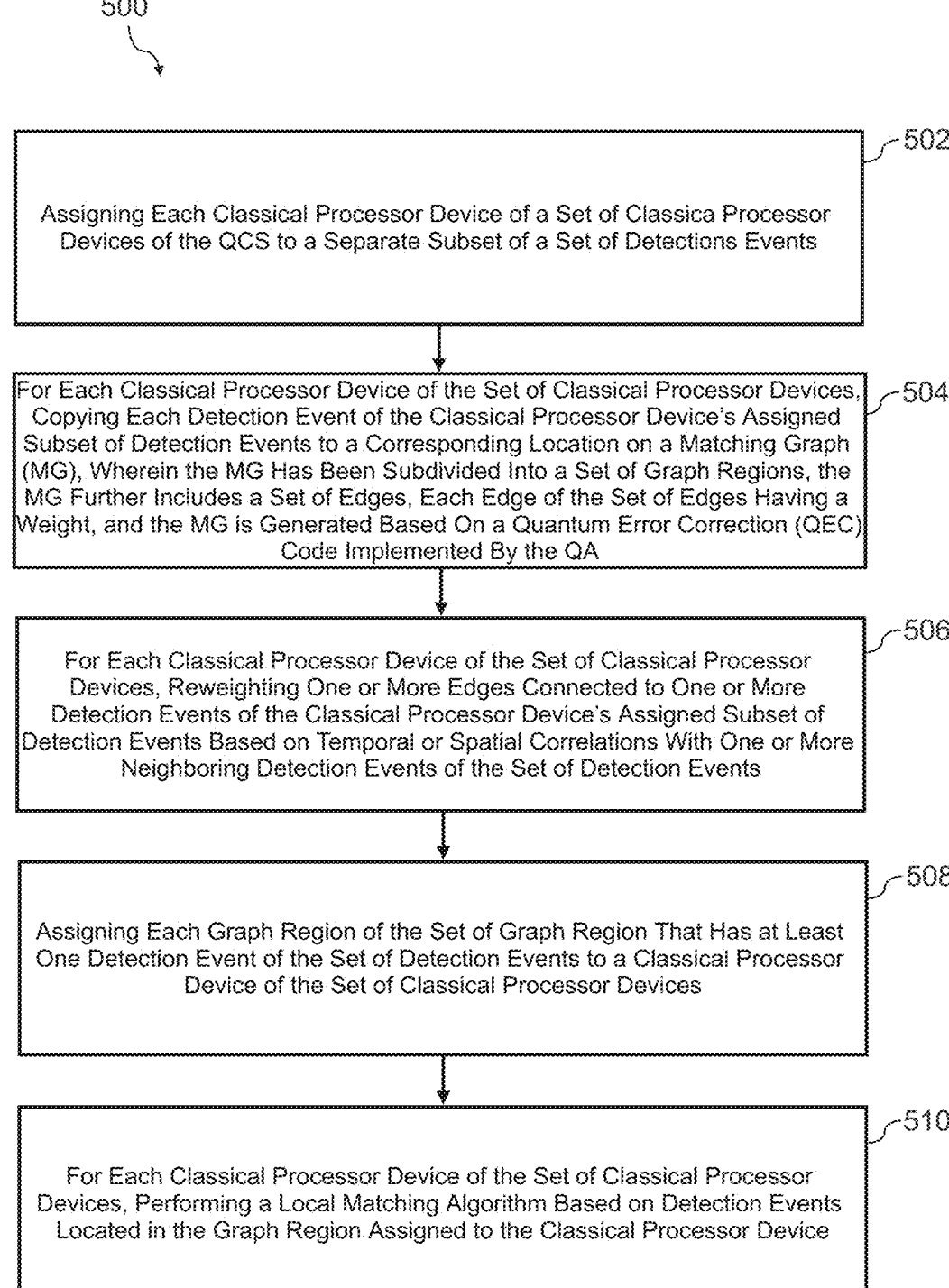

500

502

Assigning Each Classical Processor Device of a Set of Classica Processor Devices of the QCS to a Separate Subset of a Set of Detections Events

504

For Each Classical Processor Device of the Set of Classical Processor Devices, Copying Each Detection Event of the Classical Processor Device's Assigned Subset of Detection Events to a Corresponding Location on a Matching Graph (MG), Wherein the MG Has Been Subdivided Into a Set of Graph Regions, the MG Further Includes a Set of Edges, Each Edge of the Set of Edges Having a Weight, and the MG is Generated Based On a Quantum Error Correction (QEC) Code Implemented By the QA

506

For Each Classical Processor Device of the Set of Classical Processor Devices, Reweighting One or More Edges Connected to One or More Detection Events of the Classical Processor Device's Assigned Subset of Detection Events Based on Temporal or Spatial Correlations With One or More Neighboring Detection Events of the Set of Detection Events

508

Assigning Each Graph Region of the Set of Graph Region That Has at Least One Detection Event of the Set of Detection Events to a Classical Processor Device of the Set of Classical Processor Devices

510

For Each Classical Processor Device of the Set of Classical Processor Devices, Performing a Local Matching Algorithm Based on Detection Events Located in the Graph Region Assigned to the Classical Processor Device

FIG. 5

PARALLEL MATCHING FOR QUANTUM ERROR CORRECTION

PRIORITY CLAIM

The present application claims priority to U.S. Provisional Application No. 63/503,304, entitled "PARALLEL MATCHING FOR QUANTUM ERROR CORRECTION," filed on May 19, 2023, the contents of which are herein incorporated in their entirety. The present application further claims priority to U.S. Provisional Application No. 63/503, 297, entitled "IMPROVED PARALLEL MATCHING FOR QUANTUM ERROR CORRECTION," filed on May 19, 2023, the contents of which are also herein incorporated in their entirety.

FIELD

The present disclosure relates generally to quantum computing and information processing systems, and more particularly to the temporal and/or spatial parallelization of decoding qubit errors in a quantum computing system (QCS).

BACKGROUND

Quantum computing is a computing method that takes advantage of quantum effects, such as superposition of basis states and entanglement to perform certain computations more efficiently than a classical digital computer. In contrast to a digital computer, which stores and manipulates information in the form of bits, e.g., a "1" or "0," quantum computing systems can manipulate information using quantum bits ("qubits"). A qubit can refer to a quantum device that enables the superposition of multiple states, e.g., data in both the "0" and "1" state, and/or to the superposition of data, itself, in the multiple states. In accordance with conventional terminology, the superposition of a "0" and "1" state in a quantum system may be represented, e.g., as a $|0\rangle + b|1\rangle$ The "0" and "1" states of a digital computer are analogous to the $|0\rangle$ and $|1\rangle$ basis states, respectively of a qubit.

SUMMARY

Aspects and advantages of embodiments of the present disclosure will be set forth in part in the following description, or can be learned from the description, or can be learned through practice of the embodiments.

One example aspect of the present disclosure is directed to a method for operating a quantum computing system (QCS). The QCS has a set of qubits, a set of classical processor devices, and a classical cyclical buffer. The method is directed to operating the QCS during an execution, via the QCS, of a quantum algorithm (QA) that implements a quantum error correction (QEC) code. More specifically, the method is for decoding quantum errors during the execution of the QA. The QA is subdivided into a set of time-slices and includes a set of qubit measurements over the set of qubits. A separate subset of the set of qubits is available at each time-slice of the set of time-slices. The method includes prior to a current time-slice of the set of time-slices, generating, by the set of classical processor devices, a current layer of a matching graph (MG). Generating the current layer is based on a QEC code. The current layer corresponds to the current time-slice. The MG has a set of layers including the current layer, a set of boundaries of the QEC, and a set of edges. Each layer of the set of layers corresponds to a separate time-slice of the set of time-slices. A current subset of a set of detection events is inserted (or copied) on the current layer of the MG, via the set of classical processor devices. Inserting the current subset of detection events is based on a current subset of the set of qubit measurements that is available at the current time-slice. Each detection event of the current subset of qubit measurements is matched, by the set of classical processor devices, with another detection event of an inserted subset of the set of detection events or a boundary of the set of boundaries. Matching the detection events is based on the set of edges. The inserted subset of detection events comprises detection events that have already been inserted on the MG including the current subset of detection events.

Other aspects of the present disclosure are directed to various systems, methods, apparatuses, non-transitory computer-readable media, computer-readable instructions, and computing devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, explain the related principles.

BRIEF DESCRIPTION OF THE DRAWINGS

Detailed discussion of embodiments directed to one of ordinary skill in the art is set forth in the specification, which refers to the appended figures, in which:

FIG. 2B depicts a flow chart diagram of an example method for decoding quantum errors during an execution, via a quantum computing system, of a quantum algorithm, according to various embodiments;

FIG. 2C depicts a flow chart diagram of an example method for matching the detections event, according to various embodiments;

FIG. 2D depicts a flow chart diagram m of an example method for decoding quantum errors during an execution of a quantum algorithm, via a quantum computing system, according to various embodiments;

FIG. 5 depicts a flow chart diagram of an example method for decoding quantum errors during an execution, via a quantum computing system, of a quantum algorithm.

DETAILED DESCRIPTION

Figure 1:
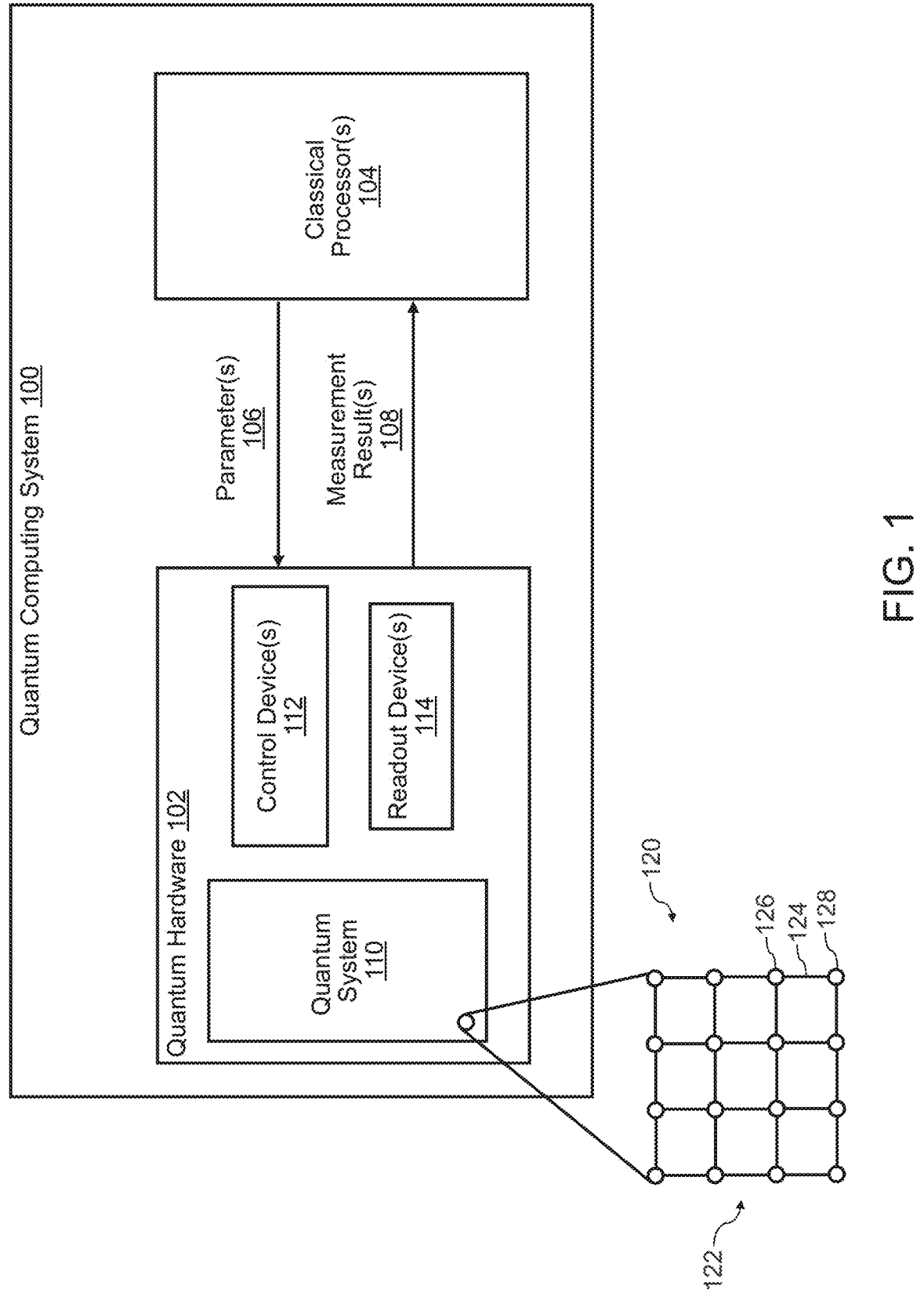
FIG. 1 depicts an example quantum computing system according to example embodiments of the present disclosure.

Example aspects of the present disclosure are directed to methods, architectures, and hardware configurations for the parallelization of decoding errors on qubits (e.g., quantum errors) in a quantum computing system (QCS). That is, the embodiments are directed towards the parallelization of the operations for decoding a quantum error correction (QEC)

code. More particularly, the embodiments are directed towards the parallelization of generating a matching graph (MG), inserting detection events on the MG, reweighting edges of the MG based on temporal/spatial correlations of the detection events, and identifying error chains by matching the detection events. As discussed throughout, some embodiments parallelize matching detection events by parallelizing the individual tasks associated with matching detection events across separate classical computing devices (or classical processing cores). Because the performance of these tasks is ordered, these embodiments may be referred to as temporal-parallelization embodiments. So-called temporal-parallelization embodiments may employ a classical cyclic buffer (e.g., classical memory buffer) that cyclically stores multiple layers of the MG so that each classical processing device can access and update MG data. Other embodiments parallelize matching detection events by subdividing the MG (which can be extremely large) into smaller graphs (e.g., graph regions or subgraphs), and parallelize the processing of each smaller graph across separate classical computing devices (or classical processing cores). Because each layer of the MG spans spatial dimensions of the QEC code (e.g., that is, a layer corresponds to a time-slice), these embodiments may be referred to as spatial-parallelization embodiments. So-called spatial-parallelization embodiments store the larger MG in a shared classical memory array, where each classical processor device has access to the shared classical memory array. Note that an MG may be generated based on a detector error model (DEM). The DEM indicates each mechanism (or error process) for each qubit and a prior probability associated with each error mechanism.

For both temporal- and spatial-parallelization embodiments, the parallelization of the embodiments is performed by subdividing classical computing tasks over a set of classical processor devices (e.g., classical cores) that are included in the QCS. The parallelization is performed in real-time (or almost real-time) and during an execution of a quantum algorithm that includes an implementation of a QEC code. The embodiments can parallelize matching detection events for QEC codes, such as but not limited to repetition codes, surface codes, and other codes. However, the embodiments are not so limited, and other QEC codes are subject to the parallelization techniques of the embodiments. In addition to the set of classical processor devices, the QCS includes a set of quantum processor devices that includes a set of qubits.

During the execution of the QEC code, the quantum circuits perform operations and measurements on the set of qubits. The results of at least some of the qubit measurements encode error signals that are indicative of quantum errors (e.g., X-type, Z-type, and Y-type errors) in the set qubits. The classical processor devices work in parallel to decode the encoded error signals (e.g., syndromes). Decoding the quantum errors may include determining which subsets of qubits may have experienced an error, what types of errors have occurred, and what quantum circuits and/or operations may be required to correct the errors. The set of classical processor devices may provide this decoded information to the set of quantum processor devices to take corrective action. The real-time interplay between the quantum processors and the classical processors, as well as the parallelization of tasks over the classical processor devices render the computationally complex task of decoding the QEC codes as practical, in a computational sense.

In QEC codes, such as but not limited to repetition codes, surface codes, and color codes, logical qubits are formed by subdividing a set of physical qubits of the QCS into a set of data qubits and a set of data qubits. A logical qubit may be formed by a subset of the data qubits and a subset of the measure qubits. During the execution of a quantum algorithm that is implementing a QEC code, multiple stabilizer circuits may operate on a logical qubit. In essence, a stabilizer circuit (or simply a stabilizer) is employed to monitor the parity of a set of data qubits without performing wavefunction-collapsing measurements on the data qubits. Rather, the qubit measurements are performed on the measure qubits. These qubit measurements (e.g., stabilizer measurements) are repeatedly performed across time-slices of a time interval corresponding to the execution of the quantum algorithm.

Stabilizer circuits are formed such that a stabilizer circuit operates on a measure qubit and two or more data qubits. Upon the stabilizer circuit operating on the associated qubits, the quantum state of the measure qubit corresponds to a parity value of the two or more data qubits, while conserving the quantum state of the two or more data qubits. That is, the quantum state of the measure qubit is an eigenstate of a stabilizer operator corresponding to the stabilizer circuit. The measure qubit is measured to determine the eigenvalue of the measure qubit's quantum state, and thus the parity of the two or more data qubits is observed. Unexpected observations of the eigenvalue (e.g., a detection event) indicate an error in at least one of the two or more data qubits. Because qubits are subject to multiple types of errors (e.g., bit-flip errors and phase-flip errors), multiple stabilizer types are required (e.g., X-type stabilizers and Z-type stabilizers). While repeatedly operating on the qubits, in order to conserve the quantum state of the data qubits, one property of a QEC code is that each stabilizer operator must commute with all the other stabilizer operators in the QEC code.

Typically, measurements of the different stabilizer types are alternated in consecutive time-slices of the QEC code. For instance, in a current time-slice, X-type measure qubits (e.g., included in X-type stabilizers) are measured, and in the next time-slice, Z-type measure qubits (e.g., included in Z-type stabilizers) are measured. Note that qubits are also subject to Y-type errors. Due to the commutation relationships between Pauli operators, any one of the three error types may be considered as a combination of the other error types. Thus, the following discussion concentrates on X-type and Z-type errors and stabilizers. However, the discussion is also applicable to Y-type errors and stabilizers. Also note that, X-type stabilizers generally monitor for Z-type (or phase-flip) qubit errors and Z-type stabilizers generally monitor for Z-type (or bit-flip) qubit errors.

QEC codes generally result in large streams of qubit measurements, where the error signatures (e.g., detection events) within the streams of qubit measurements may be correlated in both space and time. Furthermore, the frequency of consecutive time-slices within the stream of qubit measurements may be relatively high frequency (e.g., $\geq 1$ MHz). Thus, decoding the error signatures may be computationally complex (in both space and time), as the decoding must be done in real-time during an execution of a quantum algorithm that is implementing the QEC code. Decoding may include identifying errors, identifying which qubits are affected by the errors, and/or the nature of the errors (e.g., X-type or Z-type).

Because the stream of qubit measurements includes real eigenvalues (e.g., typically corresponding to parity values of the data qubits, (e.g., $\pm 1$)) of the stabilizer operators, the stream of qubit measurements are digital in nature. The embodiments render practical the decoding of the QEC code by parallelizing the decoding operations on a set of classical processor devices (e.g., classical cores).

Such decoding procedures may be modeled via a matching graph (MG). The MG may be generated on (or include) a discretized lattice over a (discretized) spacetime model of the QEC. The spacetime model includes a temporal dimension and one or more spatial dimensions, where the temporal dimension is discretized by intervals where subsets of the qubit measurements are available (e.g., the above-mentioned time-slices) and each spatial dimension is discretized by the locations of the measure qubits (or equivalently the locations of the stabilizers) within the QEC code. In at least some QEC codes contemplated by the embodiments, the locations of the stabilizers in the spacetime model corresponds to the physical locations of the associated data and measure qubits on a quantum processor that includes a qubit array with a spatial distribution of qubits. The lattice includes a set of lattice points, where a lattice point is located at a (discrete) spacetime coordinate of the discrete spacetime model. Each lattice point corresponds to a separate qubit measurement. The lattice points are arranged in a set of layers, where each layer corresponds to a separate time-slice. Thus, a layer includes a subset of the qubit measurements (and thus a subset of the lattice points) that are available at the corresponding time-slice. Edges (e.g., scaffolding) of the lattice connect qubit measurements (e.g., or lattice points) that may be correlated via a qubit error mechanism. Thus, edges connect lattice points across both the temporal and spatial dimensions of the spacetime model. More particularly, each edge corresponds to an error mechanism that may correlate the connected lattice points. In some embodiments, edges connect "nearest neighbor" lattice points. The MG may be a weighted graph, where each edge is weighted based on a prior probability associated with the error mechanism (e.g., as encoded in a DEM). At the boundaries of the QEC code, edges may connect a single qubit measurement to the QEC boundary.

A qubit measurement with an unexpected value (e.g., the parity of the data qubits is flipped between consecutive time-slices) indicates a detection event. Thus, as subsets of the qubit measurements (e.g., corresponding to layers in the MG) become available, when a detection event is observed (e.g., a qubit measurement with an unexpected value), the corresponding lattice point may be labeled as a detection event. Thus, decoding includes generating the MG and converting the large stream of qubit measurements into a smaller stream of detection events. In some embodiments, the MG may be generated (via the set of classical processors) prior to an execution of a quantum algorithm that implements the QEC code. Since each detection event corresponds to a qubit measurement, it may be said that the detection events are "hung" on the lattice of the MG at the corresponding lattice points. The detection events may be identified and hung on the lattice (via the set of classical processors) in real-time (or at least close to real-time) during the execution of the quantum algorithm as subsets of the qubits measurements become available from a quantum processor device. That is, as subsets of qubit measurements are received from the set of quantum processors, the set of classical processor devices may identify detection events and hang the detection events on the MG, parallel to the quantum processor operating on the set of qubits in accordance to the quantum algorithm, including the QEC code. Since subsets of qubit measurements are available at the discrete time-slices (corresponding to the layers of the graph), the processing of the MG (e.g., identifying and may be performed via layer by layer of the MG.

In some embodiments, decoding may include reweighting the weights of the edges of the MG based on spatial and/or temporal correlations between the detection events. After hanging or inserting the detection events on the lattice of MG, the set of classical processor devices may reweight at least a subset of the edges based on the spatial and/or temporal correlations of the detection events. As a non-limiting example of reweighting edges that connect neighboring detection events (temporal and/or spatial correlations in the detection events), a bit flip error (e.g., an X-type error) may present at a particular lattice point of the MG. As discussed above, qubits may be subject to X-type errors, Z-type errors (e.g., phase-flip errors), or Y-type errors, which may be modeled as an ordered product of an X-type and a Z-type errors. A bit-flip error may indicate that there is a phase-flip (Z) error there as well. So anytime you have a good confidence signal that either a bit-flip error is present or a phase flip error, then there is a relatively high probability that the opposite type of error is also present. The edges corresponding to these error signals may be reweighted. A reweighted edge indicates an updated probability (e.g., an updated belief) of the presence of the other type of error.

After reweighting the edges, detection events may be matched via the reweighted edges. Each detection event is matched (or paired) to at least one other detection event or a boundary of the QEC based on the weights of the edges connecting corresponding lattice points. The detection events are endpoints in an error chain, and this matching a detection event to another detection event or a QEC boundary indicate an error chain. In general, smaller error chains are more probable than longer error chains, as indicated by the probabilities of the edges, which correspond to error mechanisms. As such, the matching is performed based on the edge weights, including the reweighted edges. The edge weights may be at least approximately inversely proportional to the prior probabilities. As such, various minimum weight perfect matching (MWPM) algorithms may be employed to match the detection events. The set of classical processors are employed to performing the detection event matching.

In some embodiments, matching of the detection events is performed in two stages. Initially, a cheap matching algorithm is employed. In this cheap matching stage, two detection events that are separated by a single edge or a detection event that is separated from a boundary by a single edge are matched. In the second stage, a full matching algorithm may be employed to match any detection event that is left unmatched via the cheap matching stage. For instance, a MWPM algorithm may be applied in the full matching stage.

In the various embodiments, the QCS has a classical memory buffer. The buffer may be a cyclic buffer. Because the MG is structured in layers, the cyclic buffer may store the layers of the MG that are relevant in the current decoding operations. For instance, at a current time-slice during the execution in the quantum algorithm, the cyclic buffer may store a current layer of the MG that corresponds to the current time-slice. If a previous layer corresponding to the previous time-slice is connected to the current layer, the previous layer may be kept stored in the cyclic buffer. The cyclic buffer may be a "wrap-around" or roll over buffer, in that it may store N layers, including storing the current layer as the newest layer, as well as the previous N−1 layers. Thus, the cyclic buffer may function as a wrap-around FIFO buffer.

Thus, the embodiments provide a 4-stage parallelized method for decoding quantum errors that is implemented by a set of classical processor devices and a classical cyclic buffer. Each of the four stages may be executed by the set of classical processors included in a quantum computing system (QCS). In some embodiments, a separate classical processor device (e.g., a classical processor core) can perform each of the four stages. The four stages include generating a matching graph (MG) that includes a set of layers. At least a portion of the MG may be generated prior to an execution of a quantum algorithm that implements a quantum error correction (QEC) code. The second stage includes inserting (or hanging) detection events on the lattice of the MG as the quantum processor provides qubit measurements to the classical processor devices. The second stage also includes reweighting the edges of the MG based on temporal and/or spatial correlations in the detection events. The third stage includes a cheap matching algorithm to pair the detection events and/or QEC boundaries, while the fourth stage includes a full matching algorithm to pair any remaining detection events. The full matching algorithm may be a minimum weight perfect matching (MWPM) algorithm.

One non-limiting temporal-parallelization embodiment is directed to a method for operating a quantum computing system (QCS). The QCS has a set of qubits, a set of classical processor devices, and a classical cyclical buffer. The method is directed to operating the QCS during an execution, via the QCS, of a quantum algorithm (QA) that implements a quantum error correction (QEC) code. More specifically, the method is for decoding quantum errors during the execution of the QA. The QA is subdivided into a set of time-slices and includes a set of qubit measurements over the set of qubits. A separate subset of the set of qubits is available at each time-slice of the set of time-slices. The method includes prior to a current time-slice of the set of time-slices, generating, by the set of classical processor devices, a current layer of a matching graph (MG). Generating the current layer is based on a QEC code. The current layer corresponds to the current time-slice. The MG has a set of layers including the current layer, a set of boundaries of the QEC code, and a set of edges. Each layer of the set of layers corresponds to a separate time-slice of the set of time-slices. A current subset of a set of detection events is inserted (or copied) on the current layer of the MG, via the set of classical processor devices. Inserting the current subset of detection events is based on a current subset of the set of qubit measurements that is available at the current time-slice. Each detection event of the current subset of detection events is matched, by the set of classical processor devices, with another detection event of an inserted subset of the set of detection events or a boundary of the set of boundaries. Matching the detection events is based on the set of edges. The inserted subset of detection events comprises detection events that have already been inserted on the MG including the current subset of detection events.

Another non-limiting temporal-parallelization embodiment is directed to a method for decoding quantum errors during an execution of a quantum algorithm, via a quantum computing system (QCS). The QCS includes a set of qubits and a set of classical processor devices. The quantum algorithm includes a quantum error correction (QEC) code. The QEC includes a set of qubit measurements over the set of qubits. Prior to the execution of the quantum algorithm, the set of classical processor devices at least partially generates a matching graph (MG) based on the QEC code and a set of qubit error types associated with the set of qubits. For instance, a first classical processor device of the set of classical processor devices may generate at least some of the initial layers of the set of layers of the MG. During the execution of the quantum algorithm, the QCS may temporally interleave repeated operations. Such temporally interleaved (e.g., temporal parallelization) operations may include performing a current subset of the set of qubit measurements on the set of qubits. The set of qubit measurements is based on the QEC code. The set of classical processor devices may update the MG based on values of at least the current subset of qubit measurements. For example, detection events may be identified and inserted (or copied) to the corresponding lattice points in the MG. The edges connecting correlated detection events may be reweighted. The cheap and fill matching algorithms to match the detection events to one another or to a QEC boundary may then be performed. The set of classical processor devices may then decode one or more qubit errors based on the updated MG (e.g., the error chains indicated by matched detection events).

One non-limiting spatial-parallelization embodiment is directed to a method for decoding quantum errors during an execution, via a quantum computing system (QCS), of a quantum algorithm (QA). The method includes assigning each classical processor device of a set of classical processor devices of the QCS a separate subset of a set of detections events. For each classical processor device of the set of classical processor devices, the assigned classical processor device may copy each detection event of the classical processor device's assigned subset of detection events to a corresponding location on a matching graph (MG). The MG has been subdivided into a set of graph regions (e.g., a first spatial-parallelization). The MG further includes a set of edges. Each edge of the set of edges has a weight. The MG is generated based on a quantum error correction (QEC) code implemented by the QA. For each classical processor device of the set of classical processor devices, the assigned classical processor device reweights (or updates) one or more edges connected to one or more detection events of the classical processor device's assigned subset of detection events. Reweighting (or updating) of the weights of the MG is based on temporal or spatial correlations with one or more neighboring detection events of the set of detection events. Each graph region of the set of graph regions that has at least one detection event of the set of detection events is assigned to a classical processor device of a set of classical processor devices (e.g., a second spatial-parallelization). For each classical processor device of the set of classical processor devices, the assigned classical processor device performs a local matching algorithm based on detection events located in the graph region assigned to the classical processor device. Note that although the parallelization discussed in spatial-parallelization embodiments is not only across space, but since the MGs (and hence the graph regions) extend in time, the parallelization is also in time.

Aspects of the present disclosure provide a number of technical effects and benefits. For instance, by parallelizing the decoding process (e.g., the matching of detection events to identify qubit error chains) across space and/or time, the real-time decoding process for a QCS is tractable. Furthermore, since the data and operations of decoding the MG are classical in nature, the decoding can be offloaded to classical processor devices, in parallel with the quantum processor of the devices performing quantum operations on the qubits. The classical processor devices may be employed in a parallel way, such that the classical operations of decoding are parallelized across space and/or time. Furthermore, classical cyclic buffers and classical memory arrays may store the MG (or at least relevant layers of the MG), such that each of the classical processors has access to the classical information stored in the buffer/memory array.

FIG. 1 depicts an example quantum computing system 100. The system 100 is an example of a system of one or more classical computers and/or quantum computing devices in one or more locations, in which the systems, components, and techniques described below can be implemented. Those of ordinary skill in the art, using the disclosures provided herein, will understand that other quantum computing devices or systems can be used without deviating from the scope of the present disclosure.

The system 100 includes quantum hardware 102 in data communication with one or more classical processors 104. The classical processors 104 can be configured to execute computer-readable instructions stored in one or more memory devices to perform operations, such as any of the operations described herein. The quantum hardware 102 includes components for performing quantum computation. For example, the quantum hardware 102 includes a quantum system 110, control device(s) 112, and readout device(s) 114 (e.g., readout resonator(s)). The quantum system 110 can include one or more multi-level quantum subsystems, such as a register of qubits (e.g., qubits 120). In some implementations, the multi-level quantum subsystems can include superconducting qubits, such as flux qubits, charge qubits, transmon qubits, gmon qubits, spin-based qubits, and the like.

The type of multi-level quantum subsystems that the system 100 utilizes may vary. For example, in some cases it may be convenient to include one or more readout device(s) 114 attached to one or more superconducting qubits, e.g., transmon, flux, gmon, xmon, or other qubits. In other cases, ion traps, photonic devices or superconducting cavities (e.g., with which states may be prepared without requiring qubits) may be used. Further examples of realizations of multi-level quantum subsystems include fluxmon qubits, silicon quantum dots, or phosphorus impurity qubits.

Quantum circuits may be constructed and applied to the register of qubits included in the quantum system 110 via multiple control lines that are coupled to one or more control devices 112. Example control devices 112 that operate on the register of qubits can be used to implement quantum gates or quantum circuits having a plurality of quantum gates, e.g., Pauli gates, Hadamard gates, controlled-NOT (CNOT) gates, controlled-phase gates, T gates, multi-qubit quantum gates, coupler quantum gates, etc. The one or more control devices 112 may be configured to operate on the quantum system 110 through one or more respective control parameters (e.g., one or more physical control parameters). For example, in some implementations, the multi-level quantum subsystems may be superconducting qubits and the control devices 112 may be configured to provide control pulses to control lines to generate magnetic fields to adjust the frequency of the qubits.

The quantum hardware 102 may further include readout devices 114 (e.g., readout resonators). Measurement results 108 obtained via measurement devices may be provided to the classical processors 104 for processing and analyzing. In some implementations, the quantum hardware 102 may include a quantum circuit, and the control device(s) 112 and readout devices(s) 114 may implement one or more quantum logic gates that operate on the quantum hardware 102 through physical control parameters (e.g., microwave pulses) that are sent through wires included in the quantum hardware 102. Further examples of control devices include arbitrary waveform generators, wherein a DAC (digital to analog converter) creates the signal.

The readout device(s) 114 may be configured to perform quantum measurements on the quantum system 110 and send measurement results 108 to the classical processors 104. In addition, the quantum hardware 102 may be configured to receive data specifying physical control qubit parameters 106 from the classical processors 104. The quantum hardware 102 may use the received physical control qubit parameters 106 to update the action of the control device(s) 112 and readout devices(s) 114 on the quantum system 110. For example, the quantum hardware 102 may receive data specifying new values representing voltage strengths of one or more DACs included in the control devices 112 and may update the action of the DACs on the quantum system 110 accordingly. The classical processors 104 may be configured to initialize the quantum system 110 in an initial quantum state, e.g., by sending data to the quantum hardware 102 specifying an initial set of parameters 106.

In some implementations, the readout device(s) 114 can take advantage of a difference in the impedance for the $|0\rangle$ and $|1\rangle$ states of an element of the quantum system 110, such as a qubit, to measure the state of the element (e.g., the qubit). For example, the resonance frequency of a readout resonator can take on different values when a qubit is in the state $|0\rangle$ or the state $|1\rangle$, due to the nonlinearity of the qubit. Therefore, a microwave pulse reflected from the readout device 114 carries an amplitude and phase shift that depend on the qubit state. In some implementations, a Purcell filter can be used in conjunction with the readout device(s) 114 to impede microwave propagation at the qubit frequency.

In some embodiments, the quantum system 110 can include a plurality of qubits 120 arranged, for instance, in a two-dimensional grid 122. For clarity, the two-dimensional grid 122 depicted in FIG. 1 includes 4×4 qubits, however in some implementations the quantum system 110 may include a smaller or a larger number of qubits. In some embodiments, the multiple qubits 120 can interact with each other through multiple qubit couplers, e.g., qubit coupler 124. The qubit couplers can define nearest neighbor interactions between the multiple qubits 120. In some implementations, the strengths of the multiple qubit couplers are tunable parameters. In some cases, the multiple qubit couplers included in the quantum computing system 100 may be couplers with a fixed coupling strength.

In some implementations, the multiple qubits 120 may include data qubits, such as qubit 126 and measurement qubits, such as qubit 128. A data qubit is a qubit that participates in a computation being performed by the system 100. A measurement qubit is a qubit that may be used to determine an outcome of a computation performed by the data qubit. That is, during a computation an unknown state of the data qubit is transferred to the measurement qubit using a suitable physical operation and measured via a suitable measurement operation performed on the measurement qubit.

In some implementations, each qubit in the multiple qubits 120 can be operated using respective operating frequencies, such as an idling frequency and/or an interaction frequency and/or readout frequency and/or reset frequency. The operating frequencies can vary from qubit to qubit. For instance, each qubit may idle at a different operating frequency. The operating frequencies for the qubits 120 can be chosen before a computation is performed.

FIG. 1 depicts one example quantum computing system that can be used to implement the methods and operations according to example aspects of the present disclosure. Other quantum computing systems can be used without deviating from the scope of the present disclosure.

Temporal-Parallelization Embodiments

As discussed above, some embodiments parallelize matching detection events by parallelizing the individual tasks associated with matching detection events across separate classical computing devices (or classical processing cores). Because the performance of these tasks is ordered, these embodiments may be referred to as temporal-parallelization embodiments. So-called temporal-parallelization embodiments may employ a classical cyclic buffer (e.g., classical memory buffer) that cyclically stores multiple layers of the MG so that each classical processing device can access and update MG data.

In addition to the classical cyclic buffer, the temporal-parallelization embodiments employ a set of classical processor devices (e.g., classical processing cores) parallelize the decoding of quantum errors during the execution of a quantum algorithm and in real-time (or at least near real-time). The decoding includes matching detection events on a matching graph (MG) based on a minimum weight perfect matching (MWPM) graph algorithm. To execute a MWPM graph algorithm, first one needs a graph (e.g., a MG) on which to operate. The graphs associated with a quantum error corrected computation (e.g., a MG) consists of distinct layers, each of which is fully specified by a sequence of quantum circuits (e.g., 4 quantum circuits) that are used to detect errors in the set of qubits of a quantum computing system (QCS). Given a complete list of quantum circuits that will be used during the execution of a quantum algorithm that includes an implementation of a quantum error correction (QEC) code that detects errors, and information describing valid transitions from one circuit to another, a complete list of graph layers that may be needed during the execution of an arbitrary quantum algorithm may be constructed offline prior to the execution of the quantum algorithm. is used. These graph layers can then be compiled down into sequences of instructions to quickly construct them as needed and in real-time (e.g., a just-in-time generation of the layers).

To provide enhanced decrease of latency, the embodiments employ a reusable cyclic buffer of graph layers that may be stored in one or more classical memory devices of the QCS. This buffer may contain recently used graph layers and can also contain layers that are about to be used. The buffer can be prefilled before the QCS begins executing the quantum algorithm with all the graph layers that are thought to be likely to be needed when execution begins.

In quantum computing, some computations (e.g., those that employ non-Clifford gates) are inherently probabilistic, necessitating dynamically changing the future computation based on current measurement results. This means that future graph layers may not be perfectly predictable, however the lack of predictability can be reduced to making a decision as to which out of two possible graph layers a future layer will be used. Meaningful quantum computation cannot occur until this decision is made. To address this issue, the embodiments provide low latency classical processing.

More extreme revisions of future graph layers are also possible, for example if the QCS suffers a cosmic ray strike. This could necessitate temporarily ceasing usage of an entire region of the QCS, forcing one to reroute computation away from the region.

Figure 2A:
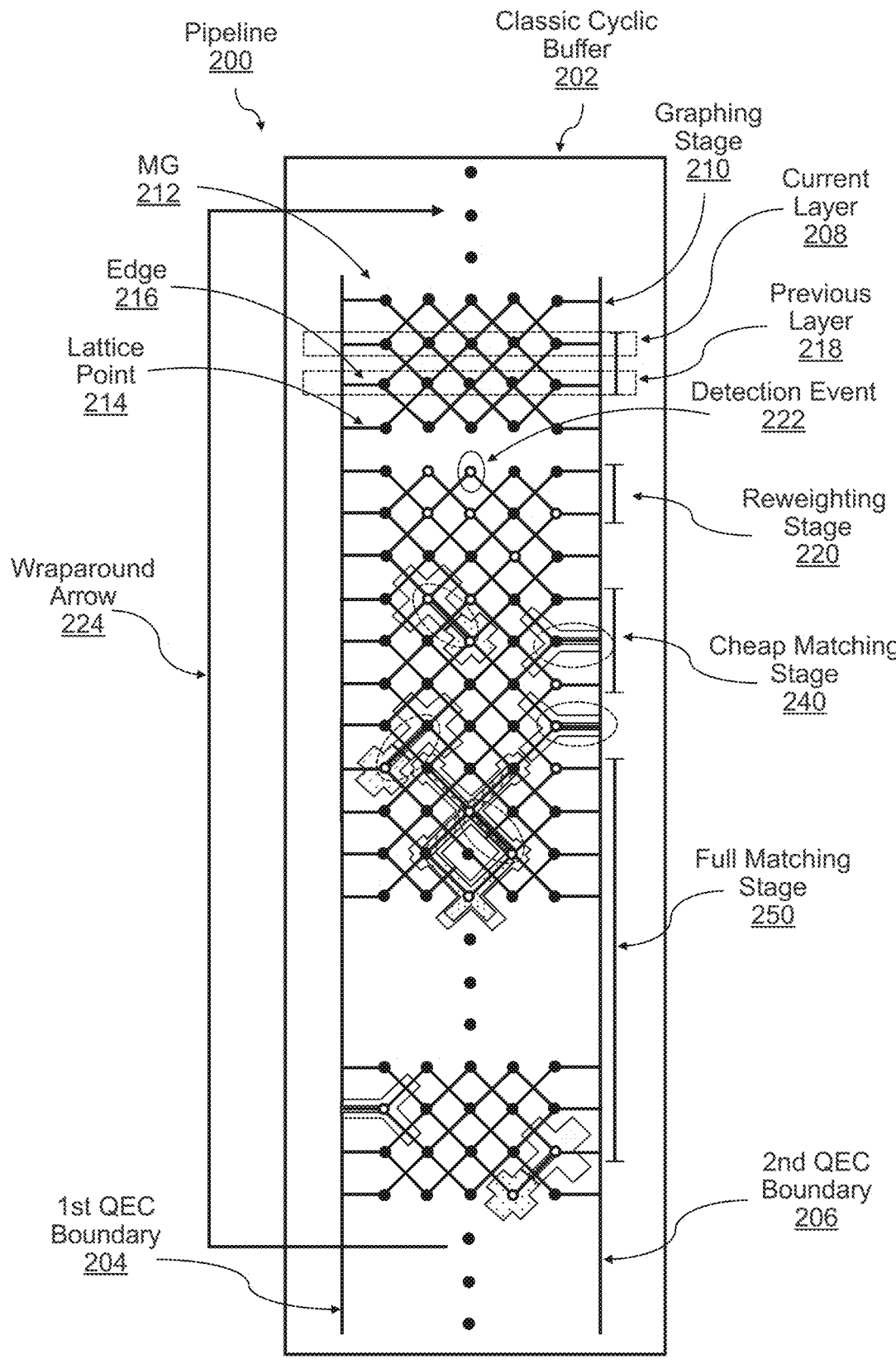
FIG. 2A shows a four-stage pipeline for the parallelization of matching detection events, according to various embodiments.

FIG. 2A shows a four-stage pipeline 200 for the parallelization of matching detection events, according to various embodiments. FIG. 2A includes a classical cyclic buffer 202, and the pipeline 200 is performed within the cyclic buffer. FIG. 2A is representative of a single time-slice (e.g., a current time-slice) of the execution of a quantum algorithm that implements a quantum error correcting (QEC) code. For the next time-slice, the processing of pipeline 200 will wraparound, as shown by the wraparound arrow 224. After the wraparound, at least some of the older data (corresponding to previous time-slices or layers in a graph) may be rewritten in the classical cyclic buffer 202 to accommodate the data (e.g., a next graph layer) of the next time-slice. The four stages of the pipeline 200 include a graphing stage 210, a reweighting stage 220, a cheap matching stage 230, and a full matching stage 250.

In the graphing stage 210, a matching graph (MG) 212 is generated based on the quantum algorithm to be executed and/or the QEC that is implemented by the quantum algorithm. The QEC implemented is a one-dimensional QEC code, such as but not limited to a repetition code. As such, the MG 212 is a two-dimensional graph (2D), with one temporal-dimensional (e.g., vertical with respect to the page) and one spatial-dimension (e.g., horizontal with respect to the page). The MG 212 includes a set of lattice points, as represented by the black dots (e.g., lattice point 214). The set of lattice points are arranged in a set of layers, each layer being oriented along at least one spatial-dimension (e.g., horizontal). As shown in FIG. 2A, the cyclic buffer 202 may store at least two layers, a current layer 208 and a previous layer 218. As noted elsewhere, the lattice points correspond to qubit measurements. The two boundaries of the 1D QEC code, a first QEC boundary 204 and a second QEC boundary 206 are shown in FIG. 2. For 2D QEC codes (e.g., a surface code or a color code), the QEC would include at least four boundaries bounding the two spatial-dimensions. In such cases, the MG 212 may be a three-dimensional (3D) graph. The MG 212 includes a set of edges, which are shown via black lines. Each edge represents an error mechanism associated with the corresponding qubit measurement and is weighted based on a prior probability for the corresponding error mechanism. The MG 212 for this particular QEC code includes two disconnected graphs as shown by the thick and thin edges.

Note that MG 212 may include many additional layers, but only a small number may need to be stored in the classical cyclic buffer 202 at any particular time-slice, e.g., the current layer 208. When the previous layer 218 is connected to the current layer, at least the previous layer 218 is also stored in the classical cyclic buffer 202 for the current time-slice. As shown in FIG. 2A, in some embodiments, additional future and/or previous layers may be stored in the classical cyclic buffer 202 depending on the size allocated to the classical cyclic buffer 202. In some embodiments, the entirety of the MG 212 is generated (or built) (via the set of classical processors) prior to starting the execution of the quantum algorithm. The entire MG 212 may be stored in classical memory, and the layers are loaded into the classical cyclic buffer 202 as they are needed (e.g., just-in-time). In other embodiments, each layer may be built prior to its associated time-slice, but during the execution of the quantum algorithm. In some embodiments, if necessary, the current layer 208 may be reset or rebuilt just prior to the corresponding time-slice. Doing this may modify the previous layer 218. Both layers may be simultaneously stored in the classical cyclic buffer 202 unless the previous layer 218 unconnected with the current layer 208.

To cope with both predictable and unpredictable changes in the required graph layer in a specific layer of the classical cyclic buffer 202, the embodiments may dedicate a specific classical processor device (e.g., a specific classical processor core) of the set of classical processor devices to the graphing stage 210. As noted above, in some embodiments, this specific classical processor device may be able to work ahead of the time of release of qubit measurements that need to be hung on the MG 212. Thus, the generating of the MG 212 may not contribute to the overall response time latency of the system. An example reference computer system is the AMD Thread-ripper, a 64-core CPU that can be loaded with a real-time operating system to ensure few pauses when processing. Under normal operating conditions, the graphing stage's 210 dedicated classical processor device (or core) can modify its current layer 208 and the previous layer 218. Each time a graph layer is constructed (corresponding to separate time slices), the sliding window of ownership shifts forward one layer. In some embodiments, the previous layer 218 only needs to be kept in the classical cyclic buffer if it is connected to the current layer 208.

The second stage of pipeline 200 is the reweighting stage 220. In reweighting stage 220, the qubit measurements (e.g., stabilizer measurements) are received. Detection events are generated based on unexpected parities (as indicated by the measurement of measurement qubits). As shown in FIG. 2A, detection events are inserted or "hung" on the corresponding lattice points. Detection events are shown via open circles (e.g., detection event 222). insert detection events. If necessary, reweight graph edges based on "nearest neighbor" correlations (over space and time). Because edges may exist between the current layer 208 and the previous layer 218, reweighting such edges may modify the previous layer 218, and thus the previous layer 218. Thus, unless the current layer 208 is unconnected to the previous layer 218, both the current layer 208 and the previous layer 218 are kept fresh in the classical cyclic buffer 202.

With the MG 212 being constructed in the classical cyclic buffer 202 ahead of the time of need of use (e.g., the current time-slice), another classical processor device of the set of classical processor devices (e.g., another classical processor core) may be dedicated to the reweighting stage 220. As noted above, and shown in FIG. 2A, the reweighting stage 220 begins by hanging detection events (e.g., detection event 222) on the current layer 208 of the MG 212. Detection events are generated by specific patterns of qubit measurements in the output measurement bitstream (e.g., those that indicate an unexpected parity associated with the corresponding stabilizer). A detection event corresponds to the endpoint of a chain of errors in the set of qubits. Each detection event can be labeled with a graph node number to enable it to be quickly copied into the relevant graph node in a layer. In the reweighting stage 220, detection events are identified and inserted next to one or more existing detection events, and if so edges correlated with edges connecting neighboring pairs of detection events are reweighted. The reweighting stage 220 may change weights of edges in the current layer 208 layer and the previous layer 218, meaning this pair of layers may be reserved in the classical cyclic buffer 202 for its exclusive use, unless the previous layer 218 is not connected to the prior layer 218.

As a non-limiting example of reweighting edges that connect neighboring detection events, a bit flip error (e.g., an X-type error) may present at a particular location. As discussed above, qubits may be subject to X-type errors, Z-type errors (e.g., phase-flip errors), or Y-type errors, which may be modeled as an ordered product of an X-type and a Z-type errors. A bit-flip error may indicate that there is a phase-flip (e.g., a Z-type) error there as well. So anytime you have a good confidence signal that either a bit-flip error is present or a phase flip error, then there is a relatively high probability that the opposite type of error is also present. The edges corresponding to these error signals may be reweighted in the reweighting stage 220. A reweighted edge indicates an updated probability (e.g., an updated belief) of the presence of the other type of error.

After the reweighting stage 220 finishes, the current layer 208 and the previous layer 218 may be released to the cheap matching stage 240. In the cheap matching stage 240, detected events separated by one edge are initially matched. Furthermore, detection events that are separated from a QEC boundary (e.g., the first QEC boundary 204 or the second QEC boundary 206) are matched to the neighboring boundary. As noted above, each detection event should be matched to another detection event or a QEC boundary. As also noted throughout, the matching should be done in a way that minimizes (or at least decreases) the total length (as weighted by the weight of the edges) of an error chain (e.g., smaller error chains are more likely than a longer error chain). Because the cheap matching stage 240 may match a detection event in the current layer 208 (e.g., the layer corresponding to time-slice t) with a detection event in the previous layer 218 (e.g., the layer corresponding to time-slice t−1), the previous layer 218 is kept stored in the classical cyclic buffer 202 such that is may be modified in the cheap matching stage 240. In some embodiments, the layer corresponding to the (t−2) time-slice may also be modified, thus that layer may also be kept stored in the classical cyclic buffer 202.

While layers of the MG 212 are constructed via a first classical processor device, and the detection events are inserted on the MG 212 and the edges are reweighted (based on spatial and/or temporal correlations of the inserted detection events), a third classical processor device of the set of classical processor devices may be employed to perform the cheap matching stage 240. As stated above, the cheap matching stage 240 matches pairs of detection events connected by a single edge in the underlying graph (or a detection event to a QEC boundary separated by a single edge). Many of the detection events can be matched in the cheap matching stage 240. In some embodiments, the cheap matching stage requires only local data, specifically the current layer 208 and the previous layer 218, and an assurance that the layer before that remains unmodified. Thus, in some embodiments, both the previous layer 218 and the current layer 208 are kept stored in the classical cyclic buffer 202, unless the previous layer 218 is unconnected to the current layer 208. The embodiments may reserve both these previous layers if they are connected. The dotted ovals show the matching of detection events. Note that in the cheap matching stage 240, two of the detector events (one in the current layer 208 and one in the previous layer 218) are connected, while a detection event in the previous layer 218 is connected to the second QEC boundary 206. Another detector event in the current layer 208 is left unmatched because it is not connected to another detector event (or a QEC boundary) via a single edge.

After the cheap matching stage 240 finishes processing the current layer 208, it may release all of the layers in the classical cyclic buffer 202 to the full matching stage 250. In the full matching stage 250, a fourth classical processor device of the set of classical processor devices may have access to at least half the classical cyclic buffer 202 to finish matching the detector events that were not matched in the cheap matching stage 240. In the full matching stage 250, a minimum weight perfect matching (MWPM) algorithm may be employed. The shaded regions in FIG. 2A shows the search space for the MWPM algorithm.

Thus, one non-limiting temporal-parallelization embodiment is directed to a method for operating a quantum computing system (QCS). The QCS has a set of qubits, a set of classical processor devices, and a classical cyclical buffer. The method is directed to operating the QCS during an execution, via the QCS, of a quantum algorithm (QA) that implements a quantum error correction (QEC) code. More specifically, the method is for decoding quantum errors during the execution of the QA. The QA is subdivided into a set of time-slices and includes a set of qubit measurements over the set of qubits. A separate subset of the set of qubits is available at each time-slice of the set of time-slices. The method includes prior to a current time-slice of the set of time-slices, generating, by the set of classical processor devices, a current layer of a matching graph (MG). Generating the current layer is based on a QEC code. The current layer corresponds to the current time-slice. The MG has a set of layers including the current layer, a set of boundaries of the QEC code, and a set of edges. Each layer of the set of layers corresponds to a separate time-slice of the set of time-slices. A current subset of a set of detection events is inserted (or copied) on the current layer of the MG, via the set of classical processor devices. Inserting the current subset of detection events is based on a current subset of the set of qubit measurements that is available at the current time-slice. Each detection event of the current subset of qubit measurements is matched, by the set of classical processor devices, with another detection event of an inserted subset of the set of detection events or a boundary of the set of boundaries. Matching the detection events is based on the set of edges. The inserted subset of detection events comprises detection events that have already been inserted on the MG including the current subset of detection events.

Another non-limiting temporal-parallelization embodiment is directed to a method for decoding quantum errors during an execution of a quantum algorithm, via a quantum computing system (QCS). The QCS includes a set of qubits and a set of classical processor devices. The quantum algorithm includes a quantum error correction (QEC) code. The QEC includes a set of qubit measurements over the set of qubits. Prior to the execution of the quantum algorithm, the set of classical processor devices at least partially generates a matching graph (MG) based on the QEC code and a set of qubit error types associated with the set of qubits. For instance, a first classical processor device of the set of classical processor devices may generate at least some of the initial layers of the set of layers of the MG. During the execution of the quantum algorithm, the QCS may temporally interleave repeated operations. Such temporally interleaved (e.g., temporal parallelization) operations may include performing a current subset of the set of qubit measurements on the set of qubits. The set of qubit measurements is based on the QEC code. The set of classical processor devices may update the MG based on values of at least the current subset of qubit measurements. For example, detection events may be identified and inserted (or copied) to the corresponding lattice points in the MG. The edges connecting correlated detection events may be reweighted. The cheap and fill matching algorithms to match the detection events to one another or to a QEC boundary may then be performed. The set of classical processor devices may then decode one or more qubit errors based on the updated MG (e.g., the error chains indicated by matched detection events).

Example Methods for Temporal-Parallelization Embodiments

FIG. 2B depicts a flow chart diagram of an example method 260 for decoding quantum errors during an execution, via a quantum computing system (QCS), of a quantum algorithm (QA). Method 260 can include and/or employ any of the features disclosed herein, including but not limited to those discussed in conjunction with FIG. 2A. The execution of the QA is subdivided into a set of time-slices. The QA includes a set of qubit measurements over a set of qubits of the QCS. A separate subset of the set of qubit measurements is available at each time-slice of the set of time-slices. Method 260 begins, at block 262, where prior to a current time-slice of the set of time-slices, a set of classical processor devices of the QCS generates a current layer of a matching graph (MG). Generating the current layer of the MG is based on a quantum error correction (QEC) code implemented by the QA. The current layer corresponds to the current time-slice. The MG has a set of layers including the current layer. Each layer of the set of layers corresponds to a separate time-slice of the set of time-slices. The MG has a set of boundaries of the QEC code and a set of edges. The MG additionally includes a discrete lattice on a spacetime model of the execution of the QA. The lattice includes a set of lattice points and the set of edges. The spacetime model has a temporal dimension and at least one spatial dimension. Each time-slice of the set of time-slices is a time-slice of the temporal dimension. Each layer of the set of layers spans at least one spatial dimension. Each lattice point of the set of lattice points corresponds to a separate qubit measurement of the set of qubit measurements. At block 264, the current layer is stored in a classical cyclic buffer.

At block 266, the set of classical processor devices inserts a current subset of a set of detection events on the current layer of the MG. Inserting the current subset of detection events on the current layer is based on a current subset of the set of qubit measurements that is available at the current time-slice. In various embodiments, each edge of the set of edges corresponds to a quantum error mechanism. Each edge has a weight associated with a prior probability of the quantum error mechanism. Each detection event of the set of detection events corresponds to an endpoint of a chain of errors in the set of qubits. Each qubit measurement of the set of qubit measurements may be a stabilizer measurement for a set of stabilizers of the QEC code. Each qubit measurement in the set of qubit measurements is performed on a measure qubit of the set of qubits. In some embodiments, the set of classical processor devices identifies each detection event in the current subset of detection events based on a corresponding stabilizer measurement having an unexpected parity value for the stabilizer measurement. Each detection event of the set of detection events is located at a corresponding lattice point. Each detection event indicates an unexpected value for the qubit measurement that corresponds to the lattice point such that the set of detection events corresponds to a subset of the set of lattice points.

At block 268, the set of classical processor devices updates (or reweights) the weight of edges of a subset of the set of edges. Updating the weight of the subset of edges is based on spatial or temporal correlations between pairs of detection events of the set of detection events. When the previous layer is disconnected from the current layer, via a subset of the set of edges, the set of classical processor devices may delete the previous layer from the classical cyclic buffer. When the previous layer is connected to the current layer, via a subset of the set of edges the set of classical processor devices may update the weight of at least a portion of the subset of edges based on spatial or temporal correlations between pairs of detection events of the current layer and the previous layer.

At block 270, the set of classical processor devices matches each detection event of the current subset of qubit measurements with another detection event of an inserted subset of the set of detection events or a boundary of the set of boundaries. Matching the detection events is based on the set of edges. The inserted subset of detection events comprises detection events that have already been inserted on the MG including the current subset of detection events. Various embodiments of matching detection events with other detection events or QEC boundaries is discussed in conjunction with method 272 of FIG. 2C. However, briefly here, matching the detection events is based on a set of edges of the MG. Each detection event of the set of detection events may correspond to an endpoint of a chain of errors in the set of qubits. Note the iterative nature of method 260, where after performing block 270, the flow of method 260 may return to block 262.

FIG. 2C depicts a flow chart diagram of an example method 272 for matching the detections event, according to various embodiments. Method 272 can include and/or employ any of the features disclosed herein, including but not limited to those discussed in conjunction with FIGS. 2A-2B. Method 272 begins at block 274, where the set of classical processor devices performs a cheap-matching algorithm. The cheap-matching algorithm matches a detection event of the set of detection events with another detection event of the set of detection events or a boundary of the QEC that are joined by a single edge of the set of edges. At block 276, the set of classical processor devices performs a full-matching algorithm. The full-matching algorithm matches pairs of detection events. The detection event of each pair of detection events matched by the full-matching algorithm was left unmatched by the cheap-matching algorithm.

In some embodiments, the full-matching algorithm is based on a minimum weight perfect matching (MWPM) algorithm. In various embodiments, the classical cyclic buffer of the QCS stores at least the current layer that corresponds to the current time-slice of the set of time-slices, a first previous layer of the set of layers that corresponds to a first previous time-slices, and a second time-slice of the set of time-slices. A temporal ordering of time-slices includes the second previous time-slice occurring prior to the first previous time-slice and the first previous time-slice occurring prior to the current time-slice. The cheap-matching algorithm matches detection events on each of the current layers, the first previous layer, and the second previous layer. The classical cyclic buffer of the QCS stores at least the current layer and at least a portion of layers generated previously. The full-matching algorithm has access to at least half of the classical cyclic buffer.

In various embodiments, a first classical processor device of the set of classical processor devices generates the current layer. A second classical processor device of the set of classical processor devices inserts the current subset of detection events on the current layer. A third classical processor device of the set of classical processor devices performs the cheap-matching algorithm. A fourth classical processor device of the set of classical processor devices performs the full-matching algorithm. In some embodiments, each of the first classical processor device, the second processor device, the third classical processor device, and the fourth classical processor device has access to the classical cyclic buffer of the QCS. The classical cyclic buffer stores a previous layer of the set of layers that has already been stored in the classical cyclic buffer. The previous layer has already had a previous subset of the set of detection events inserted on it. The previous subset of detection events is based on a previous subset of the set of qubit measurements that was available at a previous time-slice of the set of time-slices. The previous layer corresponds to the previous time-slice. In various embodiments, the first classical processor device is a first classical processing core. The second classical processor device is a second classical processing core. The third classical processor device is a third classical processing core. The fourth classical processor device is a fourth classical processing core.

FIG. 2D depicts a flow chart diagram m of an example method 280 for decoding quantum errors during an execution of a quantum algorithm (QA), via a quantum computing system (QCS), according to various embodiments. Method 280 can include and/or employ any of the features disclosed herein, including but not limited to those discussed in conjunction with FIGS. 2A-2C. The QCS includes a set of qubits and a set of classical processor devices. The quantum algorithm includes a quantum error correction (QEC) code that includes a set of qubit measurements over a first subset of the set of qubits. Method 280 begins at block 282, where prior to the execution of the quantum algorithm the set of classical processor devices at least partially generates a matching graph (MG). Generating the MG is based on the QEC code and a set of qubit error types associated with the set of qubits. At block 284, and during the execution of the quantum algorithm, iteratively and/or temporally interleaving repeated operations comprising at least blocks 286, 288, and 290. At block 286, a current subset of the set of qubit measurements is performed on the set of qubits. The set of qubit measurements is based on the QEC code. At block 288, the set of classical processor devices updates the MG based on values of at least the current subset of qubit measurements. Updating the MG may include any of the recitations associated with methods 260 of FIG. 2B and/or method 272 of FIG. 2C. At block 290, the set of classical processor devices decodes one or more qubit errors based on the updated MG.

Spatial-Parallelization Embodiments

As discussed above, some embodiments parallelize matching detection events by subdividing the matching graph (MG) into smaller graphs (e.g., graph regions or subgraphs), and parallelize the processing of each smaller graph across separate classical computing devices (or classical processing cores) of the quantum computing system (QCS). Because each layer of the MG spans spatial dimensions of the QEC code (e.g., that is, a layer corresponds to a time-slice), these embodiments may be referred to as spatial-parallelization embodiments. So-called spatial-parallelization embodiments store the larger MG in a shared classical memory array, where each classical processor device has access to the shared classical memory array.

Spatial-parallelization embodiments are directed to parallelizing the matching of detection events to solve large-problem instances by enabling the set of classical processor devices (e.g., classical processor cores) via a set of classical memory devices shared by the set of classical processor devices. Such large matching problems may involve a relatively large MG. The MG is shared in a set of classical memory devices that are shared by the set of classical processor devices.

Figure 3:
FIG. 3 shows a three-dimensional matching graph 300 that is stored in a classical memory device, according to the various embodiments.
Figure 3:
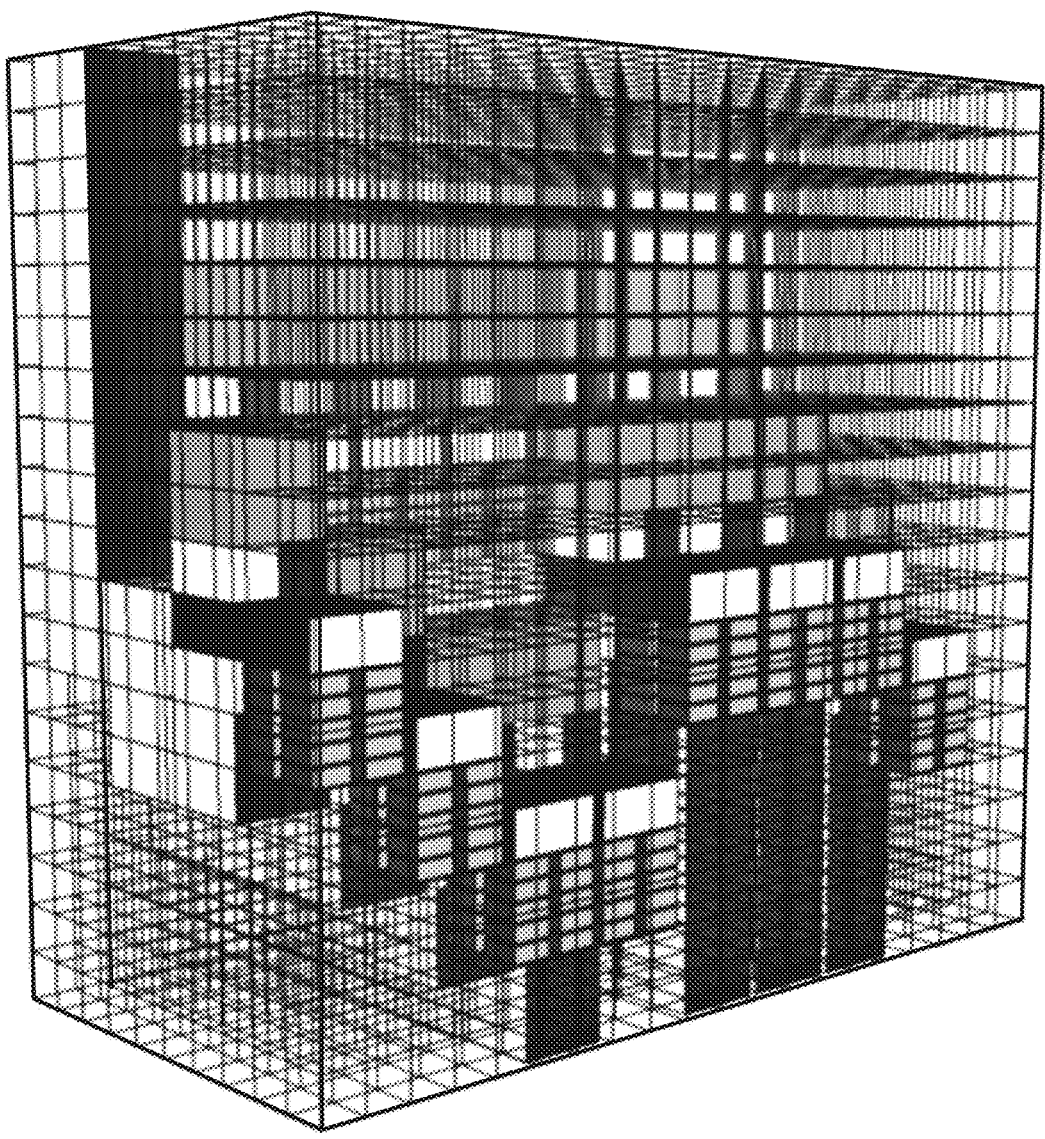

FIG. 3 shows a three-dimension (3D) matching graph (MG) 300 that is stored in a classical memory device, according to the various embodiments. The classical memory device that MG 300 is stored in may include multiple memory devices (e.g., a set of classical memory devices), such as a classical memory array. Each classical processor device of a set of classical processor devices of a quantum computing system (QCS) may have access to the classical memory array. The MG 300 may be similar to the MG 212 of FIG. 2A and/or may be generated in a similar way. Note that MG 300 is a 3D graph for a two-dimension (2D) quantum error correction (QEC) of two dimensions, e.g., a surface code or a color code. MG 300 includes a temporal dimension, which is vertical to the page and two spatial dimensions (e.g., for the two spatial dimensions of the QEC code). As shown via the shading, the embodiments subdivide the MG 300 into separate disjoint 3D regions, providing a set of 3D subgraphs. Each classical processor device of the set of classical processor devices may be dedicated to a separate subgraph of the set of subgraphs.

In some embodiments, detection events are encoded as the components of a detection event vector (e.g., $V_{de}$). Each detection event vector, coupled with MG, constitutes the complete description of a problem that needs to be solved quickly. In the following discussion, it is assumed that the MG (e.g., MG 300 of FIG. 3) has already been divided into 3D regions. As with the temporal-parallelization embodiments, the detections events (encoded in a detection event detector) need to be copied, inserted, and/or hung on the MG.

Given $n_c$ classical processing devices (or classical processing cores), and a detection event vector $V_{de}$ containing $N_{de} \gg n_c$ detection events (e.g., components), each classical processor device can calculate an approximately equal size disjoint contiguous subset of $V_{de}$ and access and copy these detection events to the MG. Each classical processor device can furthermore keep a list of all MG elements it perturbs from the original clean state for later erasure and resetting. In many instances, a single modified graph element may only be associated with a single classical processor device of the set of classical processor devices, however as discussed below, there are some more rare instances when this rule of thumb does not apply. During copying of the detection events, each detection event may also get placed in a vector or similar in the 3D graph region corresponding to its coordinate. Non-empty 3D graph regions may get added to a vector or similar data object for later processing. In the various embodiments, all writes (to the MG) associated with copying detection events may be completed before any processing associated with reweighting is commenced.

After copying the detection events to the MG stage (e.g., the copying stage) is completed, the reweighting stage may commence. During the reweighting stage, each classical processor device runs over its subset of detection events again, this time searching the graph for neighboring detection events or boundaries. If a neighboring detection event with lower label number or boundary is found, all of the edges correlated with the edge leading to it are reweighted if they have not been reweighted already. It is possible for more than one classical processor device to decide a given edge has not been reweighted and attempt to reweight it, and while this will lead to a race condition, this is acceptable as it does not matter which classical processor device performs the final reweight. Similarly, in this situation multiple classical processing devices may try to reset this graph element at the end of the algorithm, but this is again acceptable. In various embodiments, all writes associated with reweighting may be completed before any processing associated with matching is commenced.

Figure 4:
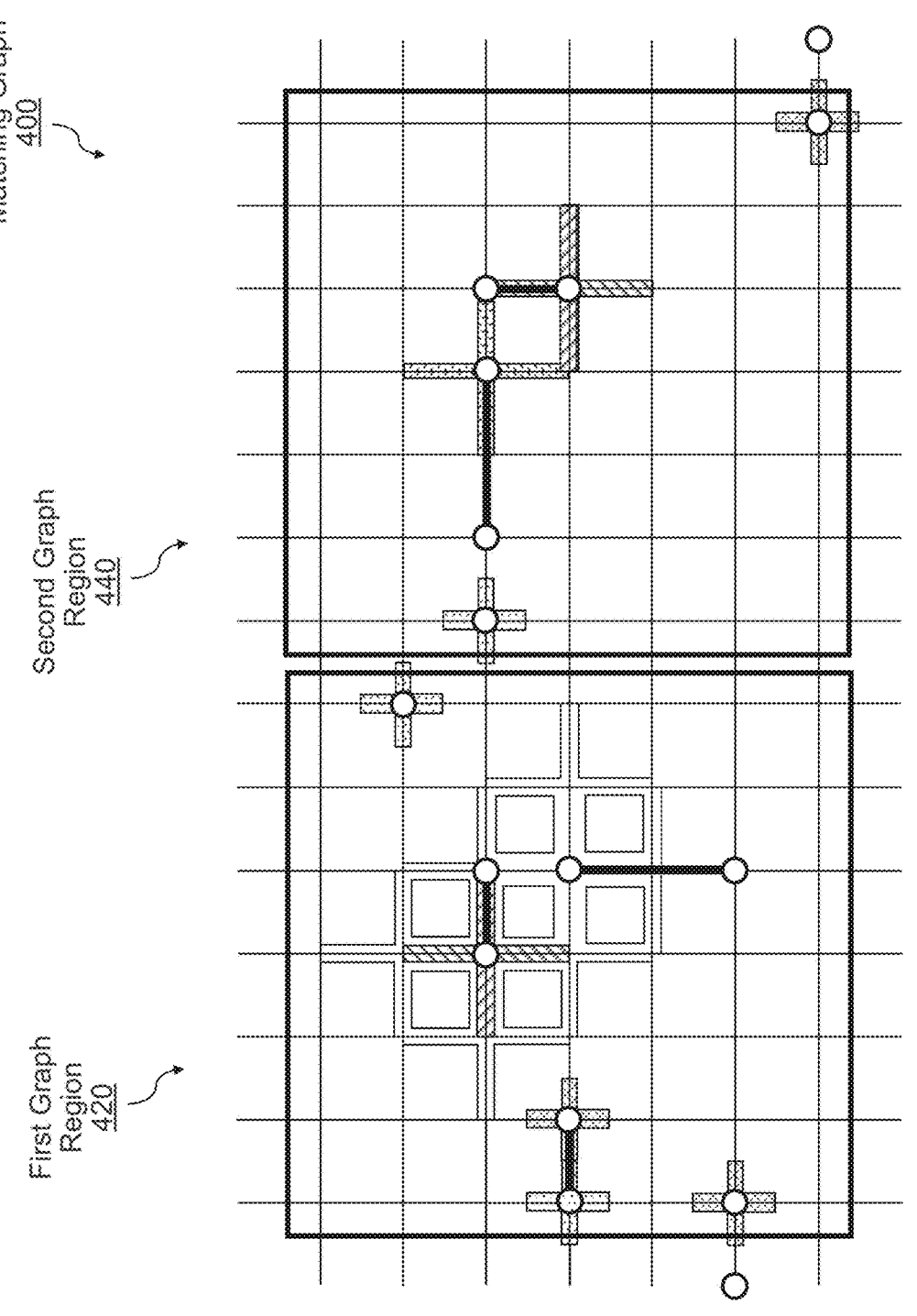
FIG. 4 demonstrates local matching of detection events, according to various embodiments.

After the reweighting stage is finished, the matching stage may proceed. In the matching stage, non-empty 3D graph regions can now be claimed by classical processor devices in a similar disjoint continuous manner to the original claiming of detection events. Such regions would then be processed exclusively locally. Thus, the matching in these embodiments may be considered local matching. FIG. 4 demonstrates local matching of detection events, according to various embodiments. More specifically, FIG. 4 shows (a portion of) a MG 400. MG 400 has been subdivided into multiple graph regions, including first graph region 320 and second graph region 440. The first graph region 420 and the second graph region 440 are neighboring graph regions in the MG 400. Neighboring graph regions (e.g., the first graph region 420 and the second graph region 440) of MG 400 can be kept totally non-interacting by only permitting exploratory regions (shown via the shaded regions emanating from the detection events) to grow along a maximum of half the length/weight of any edge emanating from a region. That is, edges leading out of a graph region only permit exploratory regions, the drivers of matching, to grow across half of their length, or equivalently to half their weight. This ensures neighboring regions are non-interacting. (e.g., see FIG. 4). Any graph regions with unmatched detection events after this initial processing may be added to a list that is-specific for further processing. Note that for simplicity, the first graph region 420 and the second graph region 440 are shown as 2D graph regions. However, as discussed throughout, the graph regions may be 3D graph regions of the 3D MG.

Each 3D graph region may have been assigned a variable that indicates a classical processor device that "owns" or is responsible for the region. A mutex may be employed to indicate graph region ownership amongst the set of classical processor devices. The mutex may default to INT MAX (no owner). After initial local processing, graph regions with unmatched detection events can start being assembled into larger regions by the classical processor devices that own the graph regions with the additional restriction that a classical processor devices (indicated by the ID n) may not claim a region next to any region owned by another classical processor device indicated by m with m<n and if during processing the classical processor device n tries to claim a region already owned by another classical processor device m with m<n then classical processor device n must release all of its regions without further processing. This avoids deadlocks, and enables matching to be completed in parallel to the case of a streaming problem with new layers of 3D graph regions being progressively added to the system. These new layers would be added when detection event copying and graph reweighting have already been completed.

One non-limiting spatial-parallelization embodiment is directed to a method for decoding quantum errors during an execution, via a quantum computing system (QCS), of a quantum algorithm (QA). The method includes assigning each classical processor device of a set of classical processor devices of the QCS a separate subset of a set of detections events. For each classical processor device of the set of classical processor devices, the assigned classical processor device may copy each detection event of the classical processor device's assigned subset of detection events to a corresponding location on a matching graph (MG). The MG has been subdivided into a set of graph regions (e.g., a first spatial-parallelization). The MG further includes a set of edges. Each edge of the set of edges has a weight. The MG is generated based on a quantum error correction (QEC) code implemented by the QA. For each classical processor device of the set of classical processor devices, the assigned classical processor device reweights (or updates) one or more edges connected to one or more detection events of the classical processor device's assigned subset of detection events. Reweighting (or updating) of the weights of the MG is based on temporal or spatial correlations with one or more neighboring detection events of the set of detection events. Each graph region of the set of graph regions that has at least one detection event of the set of detection events is assigned to a classical processor device of a set of classical processor devices (e.g., a second spatial-parallelization). For each classical processor device of the set of classical processor devices, the assigned classical processor device performs a local matching algorithm based on detection events located in the graph region assigned to the classical processor device. Note that although the parallelization discussed in spatial-parallelization embodiments is not only across space, but since the MGs (and hence the graph regions) extend in time, the parallelization is also in time.

Example Methods for Spatial-Parallelization Embodiments

FIG. 5 depicts a flow chart diagram of an example method 500 for decoding quantum errors during an execution, via a quantum computing system (QCS), of a quantum algorithm (QA). Method 500 can include and/or employ any of the features disclosed herein, including but not limited to those discussed in conjunction with FIGS. 3-4. Method 500 begins at block 502, where each classical processor device of a set of classical processor devices of the QCS is assigned to a separate subset of a set of detections events. At block 504, and for each classical processor device of the set of classical processor devices, each detection event of the classical processor device's assigned subset of detection events is copied to a corresponding location on a matching graph (MG). The MG has been subdivided into a set of graph regions. The MG further includes a set of edges. Each edge of the set of edges has a weight. The MG is generated based on a quantum error correction (QEC) code implemented by the QA. At block 506, and for each classical processor device of the set of classical processor devices, one or more edges connected to one or more detection events of the classical processor device's assigned subset of detection events is reweighted based on temporal or spatial correlations with one or more neighboring detection events of the set of detection events. At block 508, each graph region of the set of graph regions that has at least one detection event of the set of detection events is assigned to a classical processor device of a set of classical processor devices. At block 510, and for each classical processor device of the set of classical processor devices, a local matching algorithm is performed based on detection events located in the graph region assigned to the classical processor device.

In some embodiments, each edge of the set of edges corresponds to a quantum error mechanism. Each edge has a weight associated with a prior probability of the quantum error mechanism. The MG is stored in a classical memory array that each of the classical processor devices has read and write access to. The set of detection events may be encoded in a detection event vector. Each classical processor device of the set of classical processor devices is assigned an approximately equal sized and contiguous portion of the detection event vector.

In some embodiments, the MG has a lattice that has a plurality of the lattice points. Each detection event of the set of detection events corresponds to a separate lattice point of the set of lattice points. Each detection event is copied to a location of the detection event's corresponding lattice point in the MG. Copying each detection event to the corresponding location on the MG may include for each classical processor device of the set of classical processor devices, generating a list of a subset of the set of lattice points where the classical processor device has copied a detection event to.

Copying each detection event to the corresponding location on the MG may include for each graph region of the set of graph regions, generating a vector that encodes each detection event of the set of detection events that is copied to the graph region. Each detection event of the set of detection events may be copied to the corresponding location on the MG prior to reweighting the one or more edges connected to one or more detection events. Each edge that is reweighted may be reweighted prior to performing the local match algorithm. The local matching algorithm may be based on a minimum weight perfect matching (MWPM) algorithm.

In some embodiments, the local matching algorithm may include ensuring neighboring graph regions are non-interacting by allowing an exploratory region for each detection event to grow across half a length of an edge of the detection event. In other embodiments, the local matching algorithm may include ensuring neighboring graph regions are non-interacting by allowing an exploratory region for each detection event to grow across half a length of the weight of an edge of the detection event.

In various embodiments, performing the local matching algorithm includes for each graph region that has unmatched detection events after an initial performance of the local matching algorithms, merging the graph region with another neighboring graph region that has unmatched detection events after an initial performance of the local matching algorithms to generate an updated set of graph regions. The graph regions of the updated set of graph regions may be larger than the graph regions of the set of graph regions. Each graph region of the updated set of graph regions is assigned to a classical processor device of a set of classical processor devices. For each classical processor device of the set of classical processor devices, another iteration of the local matching algorithm is performed based on detection events located in the graph region assigned to the classical processor device.

Each detection event of the set of detection events may correspond to an endpoint of a chain of errors in the set of qubits. Each detection event of the set of detection events corresponds to a qubit measurement of a set of qubit measurements of the QA. Each qubit measurement of the set of qubit measurements is a stabilizer measurement for a set of stabilizers of the QEC code. Each qubit measurement in the set of qubit measurements is performed on a measure qubit of the set of qubits.

In various embodiments, method 500 further includes generating the MG based on the QEC code. The MG is subdivided into the set of graph regions. Each graph region of the set of graph regions includes a contiguous portion of a spacetime model of the execution of the QA. The MG is updated to include additional layers as a second set of detection events is received such that the updated MG has an additional portion. The additional portion of the updated MG is subdivided into a second set of graph regions. Each graph region of the second set of graph regions includes a contiguous portion of the spacetime model of the execution of the QA.

In some embodiments, the MG adds a discrete lattice on a spacetime model of the execution of the QA. The lattice includes a set of lattice points and the set of edges. The spacetime model has a temporal dimension and at least one spatial dimension. Each time-slice of the set of time-slices is a time-slice of the temporal dimension. Each layer of the set of layers spans at least one spatial dimension. Each lattice point of the set of lattice points corresponds to a separate qubit measurement of a set of qubit measurements of execution of the QA. Each detection event of the set of detection events is located at a corresponding lattice point. Each detection event indicates an unexpected value for the qubit measurement that corresponds to the lattice point such that the set of detection events corresponds to a subset of the set of lattice points.

ADDITIONAL EMBODIMENTS

One temporal-parallelization embodiment is directed to a method for decoding quantum errors during an execution, via a quantum computing system (QCS), of a quantum algorithm (QA). The execution of the QA is subdivided into a set of time-slices. The QA includes a set of qubit measurements over a set of qubits of the QCS. A separate subset of the set of qubit measurements is available at each time-slice of the set of time-slices. The method includes prior to a current time-slice of the set of time-slices, generating, by a set of classical processor devices of the QCS, a current layer of a matching graph (MG). Generating the MG is based on a quantum error correction (QEC) code implemented by the QA. The current layer corresponds to the current time-slice. The MG has a set of layers including the current layer, a set of boundaries of the QEC code, and a set of edges. The method further includes inserting, by the set of classical processor devices, a current subset of a set of detection events on the current layer of the MG. Inserting the current subset of detection events is based on a current subset of the set of qubit measurements that is available at the current time-slice. The method also includes matching, by the set of classical processor devices, each detection event of the current subset of detection events with another detection event of an inserted subset of the set of detection events or a boundary of the set of boundaries. Matching the detection events is based on the set of edges. The inserted subset of detection events comprises detection events that have already been inserted on the MG including the current subset of detection events.

In some embodiments, each edge of the set of edges corresponds to a quantum error mechanism and has a weight associated with a prior probability of the quantum error mechanism.

In some embodiments, the method further includes updating, by the set of classical processor devices, the weight of edges of a subset of the set of edges. Updating the weight of the subset of edges is based on spatial or temporal correlations between detection events of the inserted subset of detection events.

In at least one embodiment, the MG has a temporal dimension and two spatial dimensions, and the QEC code is a surface code.

In some embodiments, the method further includes prior to the current time-slice, storing, by the set of classical processor devices, the current layer in a classical cyclic buffer of the QCS. A previous layer of the set of layers has already been stored in the classical cyclic buffer. The previous layer has already had a previous subset of the set of detection events inserted on it. The previous subset of detection events is based on a previous subset of the set of qubit measurements. The previous subset of detection events was available at a previous time-slice of the set of time-slices. The previous layer corresponds to the previous time-slice.

The method may additionally include when the previous layer is disconnected from the current layer, via a subset of the set of edges, deleting, by the set of classical processor devices, the previous layer from the classical cyclic buffer.

In some embodiments, the method also includes when the previous layer is connected to the current layer, via a subset of the set of edges, updating, by the set of classical processor devices, the weight of at least a portion of the subset of edges based on spatial or temporal correlations between pairs of detection events of current layer and the previous layer.

In various embodiments, matching each detection event of the current subset of qubit measurements with another detection event of the inserted subset of detection events or the boundary of the set of boundaries includes performing, by the set of classical processor devices, a cheap-matching algorithm. The cheap-matching algorithm matches a detection event of the current subset of detection events with another detection event of the inserted subset of detection events or the boundary of the set of boundaries that are joined by a single edge of the set of edges. Matching the detection events may further include performing, by the set of classical processor devices, a full-matching algorithm. The full-matching algorithm matches pairs of detection events of the inserted subset of detection events. Each detection event of each pair of detection events matched by the full-matching algorithm was left unmatched by the cheap-matching algorithm.

In at least one embodiment, the full-matching algorithm is based on a minimum weight perfect matching (MWPM) algorithm.

In various embodiments, a classical cyclic buffer of the QCS stores at least the current layer that corresponds to the current time-slice of the set of time-slices. The classical cyclic buffer may also store a first previous layer of the set of layers that corresponds to a first previous time-slices. The classical cyclic buffer may additionally include a second previous layer of the set of layers. The second previous layer corresponds to a second previous time-slice of the set of time-slices. A temporal ordering of the set of time-slices includes the second previous time-slice occurring prior to the first previous time-slice and the first previous time-slice occurring prior to the current time-slice. The cheap-matching algorithm matches detection events on each of the current layer, the first previous layer, and the second previous layer.

In some embodiments, a classical cyclic buffer of the QCS stores at least the current layer and at least a portion of layers generated previously. The full-matching algorithm has access to at least half of the classical cyclic buffer.

In various embodiments, a first classical processor device of the set of classical processor devices generates the current layer. A second classical processor device of the set of classical processor devices inserts the current subset of detection events on the current layer. A third classical processor device of the set of classical processor devices performs the cheap-matching algorithm. A fourth classical processor device of the set of classical processor devices performs the full-matching algorithm. Each of the first classical processor device, the second processor device, the third classical processor device, and the fourth classical processor device has access to a classical cyclic buffer of the QCS. The classical cyclic buffer stores a previous layer of the set of layers. The previous layer has already been stored in the classical cyclic buffer. The previous layer has already had a previous subset of the set of detection events inserted on it. The previous subset of detection events is based on a previous subset of the set of qubit measurements. The previous subset of qubit measurements was available at a previous time-slice of the set of time-slices. The previous layer corresponds to the previous time-slice.

In such embodiments, the first classical processor device may be a first classical processing core. The second classical processor device may be a second classical processing core. The third classical processor device may be a third classical processing core. The fourth classical processor device may be a fourth classical processing core.

In various embodiments, each detection event of the set of detection events corresponds to an endpoint of a chain of errors in the set of qubits.

In some embodiments, each qubit measurement of the set of qubit measurements is a stabilizer measurement for a set of stabilizers of the QEC code. Each qubit measurement of the set of qubit measurements is performed on a measure qubit of the set of qubits.

In at least one embodiment, the method further includes identifying, by the set of classical processor devices, each detection event of the current subset of detection events. Identifying detection events is based on a corresponding stabilizer measurement having an unexpected parity value for the stabilizer measurement.

In at least one embodiment, the MG additionally includes a discrete lattice on a spacetime model of the execution of the QA. The lattice includes a set of lattice points and the set of edges. The spacetime model has a temporal dimension and at least one spatial dimension. Each time-slice of the set of time-slices is a time-slice of the temporal dimension of the spacetime model. Each layer of the set of layers spans at least one spatial dimension of the spacetime model. Each lattice point of the set of lattice points corresponds to a separate qubit measurement of the set of qubit measurements.

In such embodiments, each detection event of the set of detection events may be located at a corresponding lattice point. Each detection event indicates an unexpected value for the qubit measurement that corresponds to the lattice point such that the set of detection events corresponds to a subset of the set of lattice points.

Another temporal-parallelization embodiment is directed to a method for decoding quantum errors during an execution of a quantum algorithm. The quantum algorithm is executed by a quantum computing system (QCS). The QCS includes a set of qubits and a set of classical processor devices. The quantum algorithm includes a quantum error correction (QEC) code. The QEC code includes a set of qubit measurements over the set of qubits. The method includes prior to the execution of the quantum algorithm, at least partially generating, via the set of classical processor devices, a matching graph (MG). Generating the MG is based on the QEC code and a set of qubit error types (e.g., error mechanisms) associated with the set of qubits. During the execution of the quantum algorithm, the method includes temporally interleaving repeated operations. The interleaved and repeated operations include performing a current subset of the set of qubit measurements on the set of qubits. The set of qubit measurements is based on the QEC code. The interleaved and repeated operations further include updating, by the set of classical processor devices, the MG. Updating the MG is based on values of at least the current subset of qubit measurements. The interleaved and repeated operations further include decoding, by the set of classical processor devices, one or more qubit errors based on the updated MG.

In some embodiments, the execution of the quantum algorithm is subdivided into a set of time-slices. Updating the MG may include inserting, by the set of classical processor devices, a current subset of a set of detection events on a current layer of the MG. Inserting the current subset of detection events on the current layer is based on a current subset of the set of qubit measurements that is available at a current time-slice of the set of time-slices. Updating the MG may also include matching, at the set of classical processor devices, each detection event of the current subset of qubit measurements with another detection event of the set of qubit measurements or a boundary of the QEC code. Matching the detection events is based on a set of edges of the MG.

One spatial-parallelization embodiment is directed to a method for decoding quantum errors during an execution, via a quantum computing system (QCS), of a quantum algorithm (QA). The method includes assigning each classical processor device of a set of classical processor devices of the QCS to a separate subset of a set of detections events. The method includes for each classical processor device of the set of classical processor devices, copying each detection event of the classical processor device's assigned subset of detection events to a corresponding location on a matching graph (MG). The MG has been subdivided into a set of graph regions. The MG further includes a set of edges. Each edge of the set of edges has a weight. The MG is generated based on a quantum error correction (QEC) code implemented by the QA. The method further includes for each classical processor device of the set of classical processor devices, reweighting one or more edges connected to one or more detection events of the classical processor device's assigned subset of detection events. Reweighting the edges is based on temporal or spatial correlations with one or more neighboring detection events of the set of detection events. The method includes assigning each graph region of the set of graph regions that has at least one detection event of the set of detection events to a classical processor device of the set of classical processor devices. The method also includes for each classical processor device of the set of classical processor devices, performing a local matching algorithm. Performing the local matching algorithm is based on detection events located in the graph region assigned to the classical processor device.

In some embodiments, each edge of the set of edges corresponds to a quantum error mechanism and has a weight associated with a prior probability of the quantum error mechanism.

In at least one embodiment, the MG is stored in a classical memory array. Each of the classical processor devices of the set of classical processor devices has read and write access to the classical memory array.

In various embodiments, the set of detection events is encoded in a detection event vector. Each classical processor device of the set of classical processor devices is assigned an approximately equally sized and contiguous portion of the detection event vector.

In some embodiments, the MG has a lattice. The lattice has a plurality of the lattice points. Each detection event of the set of detection events corresponds to a separate lattice point of the set of lattice points. Each detection event is copied to a location of the detection event's corresponding lattice point in the MG. Copying each detection event to the corresponding location on the MG includes for each classical processor device of the set of classical processor devices, generating a list of a subset of the set of lattice points that the classical processor device has copied a detection event to.

In various embodiments, copying each detection event to the corresponding location on the MG includes for each graph region of the set of graph regions, generating a vector that encodes each detection event of the set of detection events that is copied to the graph region.

In at least one embodiment, each detection event of the set of detection events is copied to the corresponding location on the MG prior to reweighting the one or more edges connected to one or more detection events.

In some embodiments, each edge that is reweighted is reweighted prior to performing the local match algorithm.

In various embodiments, the local matching algorithm is based on a minimum weight perfect matching (MWPM) algorithm.

The local matching algorithm may include ensuring neighboring graph regions are non-interacting by allowing an exploratory region for each detection event to grow across half a length of an edge of the detection event.

In other embodiments, the local matching algorithm includes ensuring neighboring graph regions are non-interacting by allowing an exploratory region for each detection event to grow across half a length of the weight of an edge of the detection event.

In at least one embodiment, the MG has a temporal dimension and two spatial dimensions, and the QEC code is a surface code.

In some embodiments, performing the local matching algorithm includes for each graph region that has unmatched detection events after an initial performance of the local matching algorithms, merging the graph region with another neighboring graph region that has unmatched detection events after the initial performance of the local matching algorithms to generate an updated set of graph regions. The graph regions of the updated set of graph regions are larger than the graph regions of the set of graph regions. Performing the local matching algorithm further includes assigning each graph region of the updated set of graph regions to a classical processor device of the set of classical processor devices. Performing the local matching algorithm also includes for each classical processor device of the set of classical processor devices, performing another iteration of the local matching algorithm based on detection events located in the graph region assigned to the classical processor device.

In some embodiments, each detection event of the set of detection events corresponds to an endpoint of a chain of errors in the set of qubits.

In various embodiments, each detection event of the set of detection events corresponds to a qubit measurement of a set of qubit measurements of the QA. Each qubit measurement of the set of qubit measurements is a stabilizer measurement for a set of stabilizers of the QEC code. Each qubit measurement of the set of qubit measurements is performed on a measure qubit of the set of qubits.

In some embodiments, the method further includes generating the MG based on the QEC code. The method also includes subdividing the MG into the set of graph regions. Each graph region of the set of graph regions includes a contiguous portion of a spacetime model of the execution of the QA. The method further includes updating the MG to include additional layers as a second set of detection events is received. The updated MG has an additional portion. The method also includes subdividing the additional portion of the updated MG into a second set of graph regions. Each graph region of the second set of graph regions includes a contiguous portion of the spacetime model of the execution of the QA.

In various embodiments, the MG additionally includes a discrete lattice on a spacetime model of the execution of the QA. The lattice includes a set of lattice points and the set of edges. The spacetime model has a temporal dimension and at least one spatial dimension. Each time-slice of the set of time-slices is a time-slice of the temporal dimension. Each layer of the set of layers spans at least one spatial dimension. Each lattice point of the set of lattice points corresponds to a separate qubit measurement of a set of qubit measurements of the execution of the QA.

In at least one embodiment, each detection event of the set of detection events is located at a corresponding lattice point. Each detection event indicates an unexpected value for the qubit measurement that corresponds to the lattice point. The set of detection events corresponds to a subset of the set of lattice points.

Another embodiment includes a quantum computing system (QCS). The QCS includes a set of qubits, a set of classical processor devices, and a set of classical memory devices. The set of classical memory devices stores computer-readable instructions that when executed by the set of classical processor devices cause the set of classical processor devices to perform operations for a method. The methods performed by the set of classical devices include any of the methods and/or operations discussed herein, including, but not limited to method 260 of FIG. 2B, method 272 of FIG. 2C, method 280 of FIG. 2D, or method 500 of FIG. 5, as well as any of the methods above. That is, the QCS is configured to perform any of the temporal parallelization embodiments and/or any of the spatial-parallelization embodiments.

For instance, the method performed by the set of classical processors may be directed to decoding quantum errors during an execution of a quantum algorithm (QA), via the QCS. The execution of the QA is subdivided into a set of time-slices. The QA includes a set of qubit measurements over the set of qubits. A separate subset of the set of qubit measurements is available at each time-slice of the set of time-slices. The classical operations of the set of classical processor devices include prior to a current time-slice of the set of time-slices, generating a current layer of a matching graph (MG). Generating the current layer is based on a quantum error correction (QEC) code implemented by the QA. The current layer corresponds to the current time-slice. The MG has a set of layers including the current layer, a set of boundaries of the QEC code, and a set of edges. The classical operations further include inserting a current subset of a set of detection events on the current layer of the MG. Inserting the current subset of detection events is based on a current subset of the set of qubit measurements that is available at the current time-slice. The classical operations also include matching each detection event of the current subset of detection events with another detection event of an inserted subset of the set of detection events or a boundary of the set of boundaries. Matching the detection events is based on the set of edges. The inserted subset of detection events comprises detection events that have already been inserted on the MG. The inserted subset of detection events includes the current subset of detection events.

In another embodiment, the method performed by the set of classical processors may be directed to decoding quantum errors during an execution of a quantum algorithm, via the QCS. The QCS may include a quantum processor device that includes the set of qubits. The quantum algorithm includes a quantum error correction (QEC) code that includes a set of qubit measurements over the set of qubits. The classical operations include prior to the execution of the quantum algorithm, at least partially generating a matching graph (MG). Generating the MG is based on the QEC code and a set of qubit error types (or qubit error mechanisms) associated with the set of qubits. The classical operations further include during the execution of the quantum algorithm, temporally interleaving repeated operations. The temporally interleaved operations include performing a current subset of the set of qubit measurements on the set of qubits. The set of qubit measurements is based on the QEC code. The qubit measurements may be performed by the quantum processor device. The temporally interleaved operations further include updating the MG based on values of at least the current subset of qubit measurements. The temporally interleaved operations also include decoding one or more qubit errors based on the updated MG.

In some embodiments, the execution of the quantum algorithm is subdivided into a set of time-slices. Updating the MG may include the following operations inserting a current subset of a set of detection events on a current layer of the MG based on a current subset of the set of qubit measurements that is available at a current time-slice of the set of time-slices The operations further include matching each detection event of the current subset of qubit measurements with another detection event of the set of qubit measurements or a boundary of the QEC code. Matching the detection events is based on a set of edges of the MG.

In another embodiment, the method performed by the set of classical processors may be directed to decoding quantum errors during an execution of a quantum algorithm (QA), via the QCS. The classical operations include assigning each classical processor device of the set of classical processor devices to a separate subset of a set of detections events. The classical operations further include for each classical processor device of the set of classical processor devices, copying each detection event of the classical processor device's assigned subset of detection events to a corresponding location on a matching graph (MG). The MG has been subdivided into a set of graph regions. The MG further includes a set of edges. Each edge of the set of edges has a weight. The MG is generated based on a quantum error correction (QEC) code implemented by the quantum algorithm. The classical operations also include for each classical processor device of the set of classical processor devices, reweighting one or more edges connected to one or more detection events of the classical processor device's assigned subset of detection events. Reweighting the edges is based on temporal or spatial correlations with one or more neighboring detection events of the set of detection events. The classical operations further include assigning each graph region of the set of graph regions that has at least one detection event of the set of detection events to a classical processor device of the set of classical processor devices. The classical operations also include for each classical processor device of the set of classical processor devices, performing a local matching algorithm. Performing the local matching algorithm is based on detection events located in the graph region assigned to the classical processor device.

In at least one embodiment, the set of classical memory devices store the MG. Each of the classical processor devices of the set of classical processor devices has read and write access to the MG stored in the set of classical memory devices.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital, classical, and/or quantum subject matter and the digital functional operations and quantum operations described in this specification can be implemented in digital electronic circuitry, suitable quantum circuitry or, more generally, quantum computational systems, in tangibly-implemented digital and/or quantum computer software or firmware, in digital and/or quantum computer hardware, including the structures disclosed in this specification and their structural equivalents, or in combinations of one or more of them. The term "quantum computing systems" may include, but is not limited to, quantum computers/computing systems, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits/qubit structures, or a combination of one or more of them. Alternatively or in addition, the program instructions can be encoded on an artificially-generated propagated signal that is capable of encoding digital and/or quantum information (e.g., a machine-generated electrical, optical, or electromagnetic signal) that is generated to encode digital and/or quantum information for transmission to suitable receiver apparatus for execution by a data processing apparatus.

The terms quantum information and quantum data refer to information or data that is carried by, held, or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states (e.g., qubits) are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital or classical computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL, Quipper, Cirq, etc.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers or processors to be "configured to" or "operable to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof.

Some example elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more tangible, non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for decoding an error syndrome measured during an execution, via a quantum computing system (QCS), of a quantum algorithm (QA), the method comprising:

assigning each classical processor device of a set of classical processor devices of the QCS to a separate subset of a set of detections events that is encoded in the error syndrome;

for each classical processor device of the set of classical processor devices, copying each detection event of the classical processor device's assigned subset of detection events to a corresponding location on a matching graph (MG), wherein the MG has been subdivided into a set of graph regions, the MG further includes a set of edges, each edge of the set of edges having a weight, and the MG is generated based on a quantum error correction (QEC) code implemented by the QA;

for each classical processor device of the set of classical processor devices, reweighting one or more edges connected to one or more detection events of the classical processor device's assigned subset of detection events based on temporal or spatial correlations with one or more neighboring detection events of the set of detection events;

assigning each graph region of the set of graph region that has at least one detection event of the set of detection events to a classical processor device of the set of classical processor devices;

decoding the error syndrome based on, for each classical processor device of the set of classical processor devices, performing a local matching algorithm based on detection events located in the graph region assigned to the classical processor device, wherein decoding the error syndrome includes identifying a set of quantum errors that occurred during the execution of the QA; and during the execution of the QA, performing one or more corrective actions, via the QCS, that correct at least a subset of the set of quantum errors.

2. The method of claim 1, wherein each edge of the set of edges corresponds to a quantum error mechanism and has a weight associated with a prior probability of the quantum error mechanism.

3. The method of claim 1, wherein the MG is stored in a classical memory array such that each of the classical processor devices of the set of classical processor devices has read and write access to the MG stored in the classical memory array.

4. The method of claim 1, wherein the set of detection events is encoded in a detection event vector and each classical processor device of the set of classical processor device is assigned an approximately equally sized and contiguous portion of the detection event vector.

5. The method of claim 1, wherein the MG has a lattice that has a plurality of the lattice points and each detection event of the set of detection events corresponds to a separate lattice point of the set of lattice points and is copied to a location of the detection event's corresponding lattice point in the MG and copying each detection event to the corresponding location on the MG comprises:

for each classical processor device of the set of classical processor devices, generating a list of a subset of the set of lattice points that the classical processor device has copied a detection event to.

6. The method of claim 1, wherein copying each detection event to the corresponding location on the MG comprises:

for each graph region of the set of graph regions, generating a vector that encodes each detection event of the set of detection events that is copied to the graph region.

7. The method of claim 1, wherein each detection event of the set of detection event is copied to the corresponding location on the MG prior to reweighting the one or more edges connected to one or more detection events.

8. The method of claim 1, each edge that is reweighted is reweighted prior to performing the local match algorithm.

9. The method of claim 1, wherein the local matching algorithm is based on a minimum weight prefect matching (MWPM) algorithm.

10. The method of claim 1, wherein the local matching algorithm comprises:

ensuring neighboring graph regions are non-interacting by allowing an exploratory region for each detection event to grow across half a length of an edge of the detection event.

11. The method of claim 1, wherein the local matching algorithm comprises:

ensuring neighboring graph regions are non-interacting by allowing an exploratory region for each detection event to grow across half a length of the weight of an edge of the detection event.

12. The method of claim 1, wherein the MG has a temporal dimension and two spatial dimensions, and the QEC code is a surface code.

13. The method of claim 1, wherein performing the local matching algorithm comprises:

for each graph region that has unmatched detection events after an initial performance of the local matching algorithms, merging the graph region with another neighboring graph region that has unmatched detection events after the initial performance of the local matching algorithms to generate an updated set of graph regions, such that the graph regions of the updated set of graph regions are larger than the graph regions of the set of graph regions;

assigning each graph region of the updated set of graph regions to a classical processor device of the set of classical processor devices; and for each classical processor device of the set of classical processor devices, performing another iteration of the local matching algorithm based on detection events located in the graph region assigned to the classical processor device.

14. The method of claim 1, wherein each detection event of the set of detection events corresponds to an endpoint of a chain of errors in the set of qubits.

15. The method of claim 1, wherein each detection event of the set of detection events corresponds to a qubit measurement of a set of qubit measurements of the QA, each qubit measurement of the set of qubit measurements is a stabilizer measurement for a set of stabilizers of the QEC code and each qubit measurement of the set of qubit measurements is performed on a measure qubit of the set of qubits.

16. The method of claim 1, further comprising:

generating the MG based on the QEC code;

subdividing the MG into the set of graph regions, such that each graph region of the set of graph regions includes a contiguous portion of a spacetime model of the execution of the QA;

updating the MG to include additional layers as a second set of detection events is received such that the updated MG has an additional portion; and subdividing the additional portion of the updated MG into a second set of graph regions, such that each graph region of the second set of graph regions includes a contiguous portion of the spacetime model of the execution of the QA.

17. The method of claim 1, wherein the MG additionally includes a discrete lattice on a spacetime model of the execution of the QA, the lattice including a set of lattice points and the set of edges, the spacetime model having a temporal dimension and at least one spatial dimension, each time-slice of the set of time-slices is a time-slice of the temporal dimension, each layer of the set of layers spans the at least one spatial dimension, each lattice point of the set of lattice point corresponds to a separate qubit measurement of a set of qubit measurements of the execution of the QA.

18. The method of claim 17, wherein each detection event of the set of detection events is located at a corresponding lattice point, and each detection event indicates an unexpected value for the qubit measurement that corresponds to the lattice point such that the set of detection events corresponds to a subset of the set of lattice points.

19. A quantum computing system, comprising:

a set of qubits;

a set of classical processor devices;

a set of classical memory devices, the set of classical memory devices storing computer-readable instructions that when executed by the set of classical processor devices cause the set of classical processor devices to perform operations for decoding error syndrome measured during an execution of a quantum algorithm (QA), the operations comprising:

assigning each classical processor device of the set of classical processor devices to a separate subset of a set of detections events that is encoded in the error syndrome;

for each classical processor device of the set of classical processor devices, copying each detection event of the classical processor device's assigned subset of detection events to a corresponding location on a matching graph (MG), wherein the MG has been subdivided into a set of graph regions, the MG further includes a set of edges, each edge of the set of edges having a weight, and the MG is generated based on a quantum error correction (QEC) code implemented by the QA;

for each classical processor device of the set of classical processor devices, reweighting one or more edges connected to one or more detection events of the classical processor device's assigned subset of detection events based on temporal or spatial correlations with one or more neighboring detection events of the set of detection events;

assigning each graph region of the set of graph region that has at least one detection event of the set of detection events to a classical processor device of the set of classical processor devices;

decoding the error syndrome based on, for each classical processor device of the set of classical processor devices, performing a local matching algorithm based on detection events located in the graph region assigned to the classical processor device, wherein decoding the error syndrome includes identifying a set of quantum errors that occurred during the execution of the QA; and during the execution of the QA, performing one or more corrective actions, via the QCS, that correct at least a subset of the set of quantum errors.

20. The QCS of claim 19, wherein the set of classical memory devices store the MG such that each of the classical processor devices of the set of classical processor devices has read and write access to the MG stored in the set of classical memory devices.

* * * * *